(12) United States Patent
Gustaveson, II

(10) Patent No.: US 10,317,776 B2
(45) Date of Patent: Jun. 11, 2019

(54) CAMERA OBSTRUCTING DEVICE

(71) Applicant: SOL PALS, LLC, Draper, UT (US)

(72) Inventor: Ronald Glen Gustaveson, II, Draper, UT (US)

(73) Assignee: SOL PALS, LLC, Draper, UT (US)

( * ) Notice: Subject to any disclaimer, the term of this patent is extended or adjusted under 35 U.S.C. 154(b) by 0 days.

(21) Appl. No.: 15/806,033

(22) Filed: Nov. 7, 2017

(65) Prior Publication Data

US 2018/0059510 A1    Mar. 1, 2018

Related U.S. Application Data

(63) Continuation-in-part of application No. 15/433,151, filed on Feb. 15, 2017, now Pat. No. 9,829,770, which
(Continued)

(51) Int. Cl.
*G03B 11/04* (2006.01)
*G06F 1/06* (2006.01)
(Continued)

(52) U.S. Cl.
CPC .......... *G03B 11/048* (2013.01); *G03B 11/041* (2013.01); *G03B 11/043* (2013.01);
(Continued)

(58) Field of Classification Search
None
See application file for complete search history.

(56) References Cited

U.S. PATENT DOCUMENTS

D189,894 S    3/1961  Lang
D219,714 S    1/1971  Crestin-Billet
(Continued)

FOREIGN PATENT DOCUMENTS

CN    201114394    9/2008
CN    101980099    2/2011
(Continued)

OTHER PUBLICATIONS

Notice of Allowance for U.S. Appl. No. 29/385,909 dated Aug. 29, 2012.
(Continued)

*Primary Examiner* — William B Perkey
(74) *Attorney, Agent, or Firm* — Workman Nydegger

(57) ABSTRACT

Embodiments are directed to systems and methods for obstructing or preventing light from reaching a light detecting portion of a camera. In one scenario, a camera obstructing device is described which includes a structural housing that supports an obstructing member. The structural housing has a top channel and a bottom channel through which the obstructing member slides from an open position to a closed position. The obstructing member includes a raised edge that contacts an outside edge of the structural housing when in the open position, and another raised edge that contacts an opposite edge of the structural housing when in the closed position. The obstructing member has a section with an aperture that allows light to reach a camera in the open position, and another section with blocking material that prevents light from reaching the camera in the closed position.

25 Claims, 16 Drawing Sheets

Related U.S. Application Data is a continuation-in-part of application No. 29/585,474, filed on Nov. 23, 2016, now Pat. No. Des. 808,457, and a continuation-in-part of application No. 29/567,669, filed on Jun. 10, 2016, now Pat. No. Des. 807,947, said application No. 29/585,474 is a continuation-in-part of application No. 29/564,477, filed on May 13, 2016, now Pat. No. Des. 810,180, said application No. 15/433,151 is a continuation-in-part of application No. 29/564,477, filed on May 13, 2016, now Pat. No. Des. 810,180.

(51) Int. Cl.
  *H04N 5/225* (2006.01)
  *G06F 1/16* (2006.01)

(52) U.S. Cl.
  CPC ......... *G06F 1/1686* (2013.01); *H04N 5/2254* (2013.01); *H04N 5/2257* (2013.01)

(56) References Cited

U.S. PATENT DOCUMENTS

| | | | |
|---|---|---|---|
| D342,262 S | 12/1993 | Hester | |
| D371,508 S | 7/1996 | Sagol | |
| D390,423 S | 2/1998 | Stivender | |
| 5,801,919 A | 9/1998 | Griencewic | |
| D405,050 S | 2/1999 | Lee | |
| D435,547 S | 12/2000 | Reed | |
| 6,224,268 B1 | 5/2001 | Manning | |
| 6,406,313 B1 | 6/2002 | Victor | |
| D475,348 S | 6/2003 | D'Addario | |
| 6,572,276 B1 | 6/2003 | Theis | |
| D498,787 S | 11/2004 | Nelms | |
| 6,812,958 B1 | 11/2004 | Silvester | |
| D501,111 S | 1/2005 | Lan | |
| 7,061,536 B2 | 6/2006 | Cha | |
| D532,240 S | 11/2006 | Pressier | |
| D532,640 S | 11/2006 | Pressier | |
| 7,239,806 B2 | 7/2007 | Chen | |
| D550,159 S | 9/2007 | Kawanobe | |
| 7,431,983 B2 | 10/2008 | Amano | |
| 7,435,018 B2 | 10/2008 | Huang | |
| 7,438,486 B2 | 10/2008 | Ho | |
| 7,520,687 B2 | 4/2009 | Tsai | |
| D592,596 S | 5/2009 | Kolton | |
| 7,563,040 B2 | 7/2009 | Tsai | |
| 7,581,893 B2 | 9/2009 | Miramontes | |
| D611,333 S | 3/2010 | Sanders | |
| 7,677,815 B2 | 3/2010 | Garcia | |
| D628,774 S | 12/2010 | Sykes | |
| D633,507 S | 3/2011 | Nelson | |
| D638,526 S | 5/2011 | Newman | |
| 7,964,259 B2 | 6/2011 | Koshu | |
| 7,973,856 B2 | 7/2011 | Lee | |
| D643,457 S | 8/2011 | DeLong | |
| D645,022 S | 9/2011 | Lee | |
| D650,408 S | 12/2011 | Kim | |
| D659,403 S | 5/2012 | Lerman | |
| 8,242,924 B2 | 8/2012 | Huang | |
| D669,112 S * | 10/2012 | Gustaveson | D16/208 |
| D672,312 S | 12/2012 | Lee | |
| 8,471,956 B2 * | 6/2013 | Fortmann | G06F 1/1613 |
| | | | 348/373 |
| 8,496,390 B2 | 7/2013 | Ohuchi | |
| D702,637 S | 4/2014 | Rayner | |
| D703,149 S | 4/2014 | Lee | |
| D708,248 S | 7/2014 | Son | |
| D708,657 S | 7/2014 | Gustaveson | |
| 8,780,205 B2 | 7/2014 | Boutell | |
| D714,220 S | 9/2014 | Izen | |
| D714,852 S | 10/2014 | Levesque | |
| D718,803 S | 12/2014 | Smith | |
| D720,382 S | 12/2014 | Szarawarski | |
| D721,396 S | 1/2015 | Gustaveson | |
| D726,806 S | 4/2015 | Demars | |
| D727,848 S | 4/2015 | Burgett | |
| D736,158 S | 8/2015 | Rayner | |
| D737,217 S | 8/2015 | Leidolt | |
| D740,773 S | 10/2015 | Bang | |
| D745,469 S | 11/2015 | Farnum | |
| 9,197,850 B2 | 11/2015 | Koberling | |
| D749,555 S | 2/2016 | Poon | |
| 9,305,538 B2 | 4/2016 | Tyson | |
| 9,307,129 B2 * | 4/2016 | Oh | H04N 5/2254 |
| D755,720 S | 5/2016 | Dobler | |
| D756,443 S | 5/2016 | Ju | |
| D759,644 S | 6/2016 | Penn | |
| D759,645 S | 6/2016 | Penn | |
| D760,677 S | 7/2016 | Tsushima | |
| D763,843 S | 8/2016 | Gustaveson | |
| D764,474 S | 8/2016 | Penn | |
| 9,465,276 B2 | 10/2016 | Jonsson | |
| D782,562 S | 3/2017 | Gustaveson | |
| 9,829,770 B1 * | 11/2017 | Gustaveson, II | G03B 11/048 |
| 9,854,142 B2 | 12/2017 | Freeze | |
| D807,947 S | 1/2018 | Gustaveson | |
| D808,457 S | 1/2018 | Gustaveson | |
| D810,089 S | 2/2018 | Kuo | |
| D810,180 S | 2/2018 | Gustaveson | |
| D816,149 S | 4/2018 | Dalton | |
| 10,070,021 B1 | 9/2018 | Rolle | |
| 2005/0068423 A1 | 3/2005 | Bear et al. | |
| 2007/0025725 A1 | 2/2007 | Yen | |
| 2008/0100713 A1 * | 5/2008 | Liu | H04N 5/2251 |
| | | | 348/207.99 |
| 2009/0252487 A1 | 10/2009 | Matsumoto | |
| 2009/0284635 A1 | 11/2009 | Sung | |
| 2010/0102979 A1 | 4/2010 | Huang | |
| 2010/0166414 A1 | 7/2010 | Zhang et al. | |
| 2011/0051335 A1 | 3/2011 | Han | |
| 2011/0058255 A1 | 3/2011 | Weiss | |
| 2011/0115924 A1 * | 5/2011 | Yu | G06F 1/1605 |
| | | | 348/207.11 |
| 2011/0182029 A1 | 7/2011 | Wu | |
| 2012/0229700 A1 | 9/2012 | Hsiung | |
| 2013/0088639 A1 | 4/2013 | Mundt | |
| 2014/0119718 A1 | 5/2014 | Oh | |
| 2014/0198439 A1 * | 7/2014 | De Pietro | G06F 1/16 |
| | | | 361/679.02 |
| 2014/0220269 A1 | 8/2014 | Ogufere | |
| 2015/0009399 A1 | 1/2015 | Jonsson | |
| 2015/0015777 A1 | 1/2015 | Osbourne | |
| 2015/0059251 A1 | 3/2015 | Rinner | |
| 2015/0163385 A1 * | 6/2015 | Haddad | H04N 5/2254 |
| | | | 348/374 |
| 2015/0229746 A1 | 8/2015 | Bergin | |
| 2015/0311941 A1 | 10/2015 | Sorrentino | |
| 2015/0320167 A1 | 11/2015 | Nguyen | |
| 2016/0049979 A1 | 2/2016 | Grouwstra | |
| 2016/0088264 A1 * | 3/2016 | Freeze | H04N 5/2254 |
| | | | 348/143 |
| 2016/0105598 A1 * | 4/2016 | Zeira | H04N 5/23203 |
| | | | 348/143 |
| 2016/0142594 A1 | 5/2016 | Luttrell | |
| 2016/0161830 A1 * | 6/2016 | Gonzalez Sanchez | |
| | | | G06F 1/1686 |
| | | | 396/448 |
| 2016/0323491 A1 | 11/2016 | Al Marzouqi | |
| 2017/0146795 A1 | 5/2017 | Pahlitzsch | |
| 2017/0329206 A1 | 11/2017 | Perkey | |
| 2018/0123631 A1 | 5/2018 | Hessabi | |
| 2018/0140196 A1 | 5/2018 | Khosravi Simchi | |

FOREIGN PATENT DOCUMENTS

| | | |
|---|---|---|
| EM | 003566330-0001 | 1/2017 |
| ES | 1076643 | 4/2012 |
| ES | 1077518 | 8/2012 |
| JP | 2001309003 | 11/2001 |
| JP | 2003289358 | 10/2003 |
| JP | 2004055630 | 2/2004 |

(56) References Cited

FOREIGN PATENT DOCUMENTS

| JP | 2004072436 | 3/2004 |
|---|---|---|
| JP | 2004275434 | 10/2004 |
| JP | 2004309964 | 11/2004 |
| JP | 2005227445 | 8/2005 |
| JP | 2005275074 | 10/2005 |
| JP | 2005323049 | 11/2005 |
| JP | 2005345576 | 12/2005 |
| JP | 2009271407 | 11/2009 |
| JP | 2010210936 | 9/2010 |
| KR | 20040070899 | 8/2004 |
| KR | 20050015787 | 2/2005 |
| KR | 200405362 | 1/2006 |
| KR | 20060106527 | 10/2006 |
| KR | 100640798 | 11/2006 |
| KR | 20100003957 | 1/2010 |
| KR | 20100003957 | 4/2010 |
| WO | 2009137600 | 11/2009 |

OTHER PUBLICATIONS http://webcamcovers.blogspot.com/2012/09/c-slide-webcam-cover-patent-recieves.html Company Release: Sep. 18, 2012 Retrieved on: Feb. 26, 2014.

http://www.amazon.com/Webcam-Cover-Laptops-Pad-Devices/dp/B004ZOXSY6/ref=sr_1_2?s=electronics&ie=UTF88(qid=1393520771&sr=1-2&keywords=webcam+covers Available on Amazon beginning May 3, 2011 Retrieved on: Feb. 26, 2014.

http://www.ebay.com/itm/Webcam-Cover-also-known-as-webcam-shutter-webcam-shutter-fits-all-laptops-/160917145450#ht_2076wt_1358 on E-Bay beginning Jan. 26, 2012 Retrieved on: Feb. 26, 2014.

Notice of allowance for U.S. Appl. No. 29/433,900 dated Mar. 10, 2014.

Ex Parte Quayle Action for U.S. Appl. No. 29/473,247 dated Aug. 5, 2014.

Notice of Allowance for U.S. Appl. No. 29/520,343 dated Jun. 29, 2016.

Notice of Allowance for U.S. Appl. No. 29/548,560 dated Nov. 17, 2016.

Webcam Cover Black. [online] Published date unknown. Retrieved on Oct. 28, 2016 from <URL:http://thewebcamcovers.com/shop/webcamcover-black/>.

Restriction Requirement in U.S. Appl. No. 29/564,477 dated May 16, 2017.

PM: Webcam-Cover des Start-ups Privoo ab Juli im Handel. [online] published date Apr. 24, 2017. Retrieved on Apr. 29, 2017 from <URL:http://unternehmen-heute.de/news.php?newsid=426363>.

Swivel Webcam Cover silver.[online] published date unknown. Retrieved on Apr. 29, 2017 from ,URL:http://www.intraco.nl/en/verkoop-andere-producten/swivel-webcam-cover-silver/>.

Early Spyslide 1-Pack Indiegogo Price. [online] published date unknown. Retrieved on Apr. 29, 2017 from <URL:https://spyfy.com/product/spyslide-webcam-cover-1-pack-indiegogo/?lang=en>.

Office Action in U.S. Appl. No. 15/433,151 dated Jul. 11, 2017.

Ex Parte Quayle Action for U.S. Appl. No. 29/585,474 mailed on Jul. 13, 2017.

Ex Parte Quayle Action for U.S. Appl. No. 29/567,669 mailed on Jul. 12, 2017.

Webcamcover 2.0 black. [online] Oublished date unknown. Retrieved on Jun. 12, 2017 from <URL:https://thewebcamcovers.com/product/webcamcover-2-0-black/>.

"Screen Cleaner Pad for Mobile Phones AllAccessories", Publish Date: Sep. 12, 2011, Access Date: Sep. 26, 2017 from <https://www.youtube.com/watch?v=7TFo1-ceBUw>.

"DigiClean Plus Microfiber Screen Cleaners", Publish Date: Aug. 30, 2011, Access Date: Sep. 26, 2017, from <https://www.youtube.com/watch?v=-LWFp8Z-fzA>.

"DigiClean Plus Mobile Phone Screen Cleaner / Wipe Stickers", Publish Date: Jun. 29, 2012, Access Date: Sep. 26, 2017, from <https://www.youtube.com/watch?v=EHK9UWFUGa0>.

Promotional Peep Black Webcam Cover for Smartphones. Online, published date unknown. Retrieved on Feb. 22, 2018 from URL: http://www.promo-brand.co.uk/products/technology-and-gadgets/computer-accessories/147-Promotional%20Peep%20Black%20Webcam%20Cover/promotional-peep-black-webcam-cover-for-smartphones-tablets-and-law.

Webcam cover—Heart. Online, published date uknown. Retrieved on Feb. 22, 2018 from URL: http://www.colormotion.com.hk/-colormotion-household-webcam-covers/1152-webcam-cover-heart.html.

Restriction Requirement for U.S. Appl. No. 29/596,617 dated Apr. 2, 2018.

Notice of Allowance for U.S. Appl. No. 29/661,937 dated Nov. 15, 2018.

Non-Final Office Action for U.S. Appl. No. 29/634,480 dated Jan. 4, 2019.

Notice of Allowance for U.S. Appl. No. 29/612,937 dated Nov. 23, 2018.

Non-Final Office Action for U.S. Appl. No. 29/634,481 dated Nov. 29, 2018.

2017 WebCam Shutter Magnet Slider Plastic Camera Cover for Web Laptop iPad PC Mac Tablet Privacy 2pcs in pack. Amazon [online]. WeiYou [retrieved on Mar. 22, 2019] <Url: https://www.amazon.comWebCam-Shutter-Magnet-Plastic-Privacy/dp/B0783Q9ZJN/ref=sr_1_779?s=pc&ie=UTF8&qid=1545868517&sr=1-779&keywords=webcam+cover>

Webcam Cover 0.7mm Thin—Magnet Slider Camera Cover—Protects Your Privacy, Stops Webcam Spying, Fits Smartphone Laptops Macbooks PCs Tablets and All-in-one desktops (Silver(2pack)). Amazon [online]. sunshot [retrived Mar. 22, 2019] <Url: https://www.amazon_com/WebCam-Cover-0-7mm-Thin-All/dp/B0749DC118/ref=sr_1_108?s=pc&ie=UTF8&clid=1545866311&sr=1-108&keywords=webcam+cover>.

Webcam Cover—Black Metal Magnet Slider—for Laptops Macbooks PCs Tablets Smartphones TV , for Privacy and Security against Cam Hacks by Unitedtime (Black Metal 2 Pack). Amazon [online]. Unitedtime [retrived Mar. 22, 2019] <Url: https://www_amazon_com/Webcam-Cover-Black-Magnet-Slider/dp/B076KN9W4P/ref=sr_1_66_sspa? s=pc&ie=UTF8&clid=1545866239&sr=1-66-spons&keywords=webcarn+cover&psc=1>.

Xberstar 3pcs Silver Webcam Camera Protector Cover Slider Shield for Notebook Laptop Tablet iPhone Android Smartphones (Black). Amazon [online]. Xyberstar [retrieved on Mar. 22, 2019]<Url: https://www.amazon.com/Xberstar-Protector-Notebook-Android-Smartphones/dp/B077PRKM2W/ref=sr_1_41? e=UTF8&clid=1545969524&sr=8-41&keywords=magnet+webcam+cover>.

Webcam Cover Slide 0.027in Ultra Thin Metal Magnet Web Camera Cover for MacBook Pro Laptops Smartphone Mac 3C Tablets for Echo Spot Show Protecting Your Privacy Security Black(3 Packs). Amazon [online]. Cimkiz [retrived on Mar. 22, 2019] <Url: https://www.amazon_com/0-027in-MacBook-Smartphone-Protecting-Security/dp/B077ZT29P2/Ref=sr_1_5?s=pc&ie=UTF8&clid=1545865796&sr=1-5&keywords=webcam+cover>.

Gurmore Webcam Cover Slider, 0.027In Ultra Thin Metal Magnet Black Web Camera Cover for Laptops Smartphone MacBook Pro PCs Tablets Protecting Your Privacy and Security Against Cam Hacks. Amazon [online]. GURMORE [retrieved on Mar. 22, 2019] <Url: https://www.amazon.com/Gurmore-Slider%Ef%Bc%8C0-027in-Smartphone-Protecting-Security/dp/B07B9WJKFN/ref=sr_1_74? s=pc&ie=UTF8&clid=1545866239&sr=1-74&keywords=webcam+cover>.

Cimkiz WBU1+WB02 Webcam Cover Slide, Metal Magnet Web Camera Cover, for Laptops Macbook Pro PCs Tablets cellphone-for Protecting Your Privacy-Strong Adhesive-12 packs(6black+6silver) General Packaging. Amazon [online] Cimkiz [retrieved on Mar. 22, 2019]<Url: https://www.amazon.com/dp/B078TWRN4Q/ref=sxbs_sxwds-stvpv2_1?pf_rd_p=6375e697-f226-4dbd-a63a-5ec697811ee1&pd_rd_wg=YzZ79&pf_rd_r=665J7NDJMTCEA722Dk0W&pd_rd_i=B078111VRN4Q&pd_rd_w= big.

Webcam Cover, Web Camera Cover Rotate for Laptop Desktop Tablet Smartphone MacBook Pro iMac iPhone Notebook Computer,Protect Your Privacy and Security, Strong 3M Adhensive Webcam Cover (Black). Amazon [online]. AOGE [retrieved on Mar.

(56) References Cited

OTHER PUBLICATIONS 22, 2019] <URL: https://www.amazon.com/Smartphone-Notebook-Computer-Security-Adhensive/dp/B07F3Y7R4R/ref=sr_1_100?s=pc&ie=UTF8&qid =1545866311&sr=1-100&keywords=webcam+cover>.

Webcam Cover Slider Slim Thin Laptop Camera Cover Suitable for Mac Desktop iMac Ipad iPhone Smartphone Protect Your Privacy Prime. Amazon [online]. MorganProducts [retrieved on Mar. 22, 2019] <URL: https://www.amazon.com/Suitable-Desktop-Smartphone-Protect-Privacy/dp/B07H4LYRZM/ref=sr_1_43? s=pc&ie=UTF8&qid=1545866180&sr=1-43&keywords=webcam+cover>.

"Webcam Cover I Black Slider (1 Pack) Laptop Camera Cover Slide | Protects Computer & Smartphone Camera ogainst Hackers Swiss Made Webcamera Slider | Web Cam Blocker. Amazon [online]. ProTech Privacy [retrieved Mar. 22, 2019] <URL: https://www.amazon.com/Protects-Computer-Smartphone-Against-Webcamera/dp/B018NOLCNM/ref=sr_1_1_sspa?ie=UTF8&qid=1545855356&sr=8-1-spons&keywords=twist+webcam+cover&psc=1>".

Webcam Cover, Amarto 3 pack Web Camera Cover Slide for Laptop, Desktop, PC, Macbook Pro, iMac, Mac Mini, Computer, Smartphone, protecting Privacy and Security, Strong Adhesive (Black). Amazon [online]. Amarto [retrieved on Mar. 22, 2019] <URL: https://www.amazon.com/Recommended-Macbook-Internet-Security-Privacy/dp/B07BT1HYVP/ref=sr_1_42?s=pc&ie=UTF8&qid=1545866180&sr=1-42&keywords=webcam+cover>.

Webcam Cover by imluckies, Slide Metal Camera Cover for MacBook Pro, Laptop, Mac, PC, iPhone[2 Pack]. Amazon [online]. imluckies [retrieved on Mar. 22, 2019] <URL: https://www.amazon.comWebcam-imluckies-Camera-MacBook-Laptop/dp/B07C24NBGL/ref=sr_1_150_sspa?s=pc&ie=UTF8&qid=1545867637&sr=1-150-spons&keywords=webcam+cover&psc=1)>.

\* cited by examiner

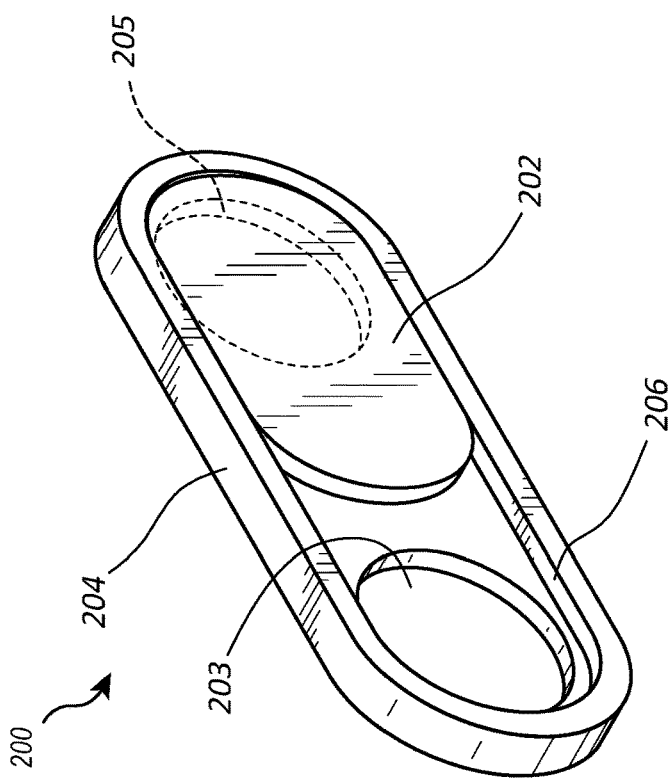
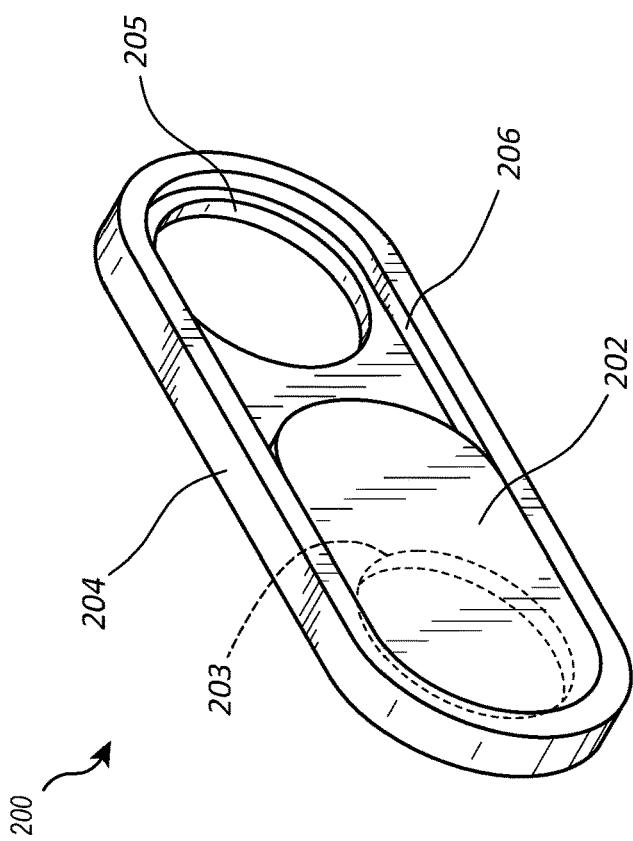

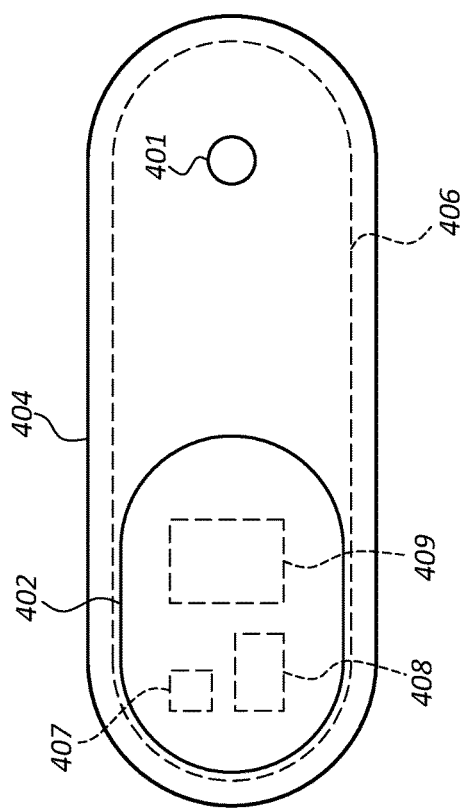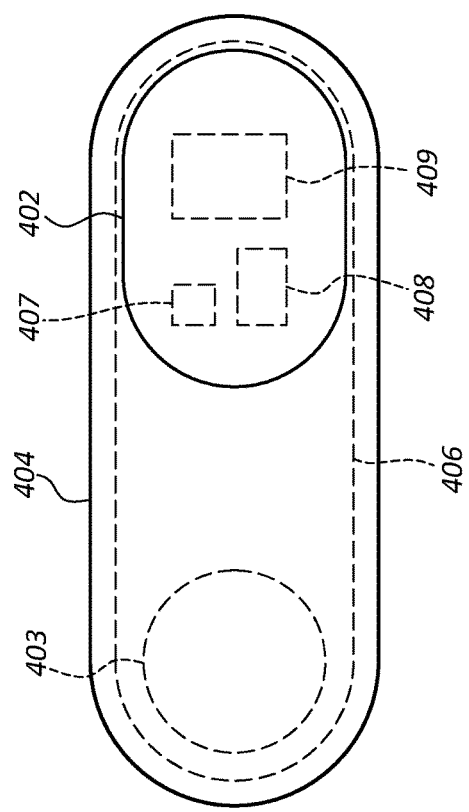

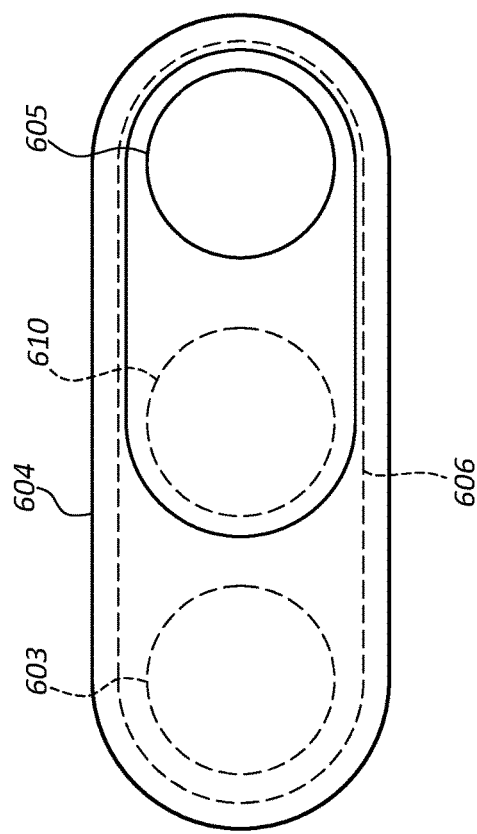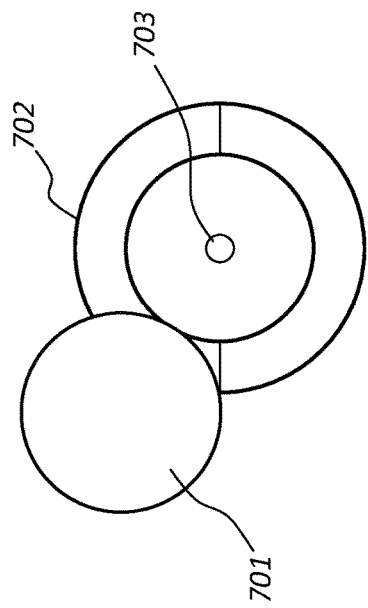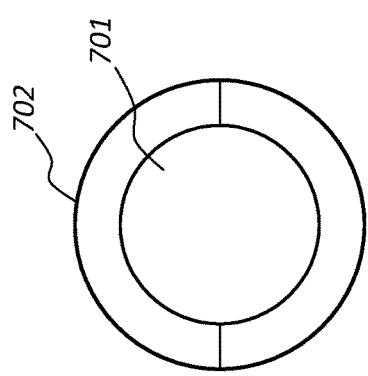

CAMERA OBSTRUCTING DEVICE

CROSS-REFERENCE TO RELATED APPLICATIONS

This application is a continuation-in-part of and claims priority to U.S. patent application Ser. No. 15/433,151, entitled "Camera Obstructing Device," filed on Feb. 15, 2017, which application is a continuation-in-part of U.S. Design application Ser. No. 29/564,477, entitled "Webcam Cover," filed on May 13, 2016, U.S. Design application Ser. No. 29/585,474, entitled "Webcam Cover," filed on Nov. 23, 2016, and U.S. Design application Ser. No. 29/567,669, entitled "Sliding Webcam Cover," filed on Jun. 10, 2016, each of which is incorporated by reference herein in its entirety.

BACKGROUND

Computing systems have become highly integrated in the workforce, in the home, in mobile devices, and many other places. Many computing systems, such as laptops, mobile phones, televisions and wearable devices come equipped with cameras. These cameras allow for many different useful features including taking pictures, recording videos, video conferencing and other features. As such, embedding cameras into electronic devices has become commonplace.

In some instances, however, the cameras embedded in these devices may be operated without the owner's knowledge. Indeed, malicious users may be able to execute software code on an unsuspecting user's device that allows the malicious user to control one or more of the electronic device's features, including the camera. In cases where this malicious software is installed on an electronic device, that device may be turned on surreptitiously, and may begin transmitting a video or photo feed to a remote destination (e.g. via WiFi or a cellular connection). Thus, a user's device may be video recording them or taking pictures of them without their permission and without their knowledge. This may lead to the public release of photographs or videos that were taken against the user's will.

If the user discovers the malicious software running on their device (e.g. via anti-virus software or by seeing a "camera on" indicator light), the user can take steps to turn the camera off and uninstall the malicious software. However, in many cases, the software is designed to run the camera in a stealth mode that does not initialize the "camera on" light. As such, the user may not know that they have any cause for concern, and may be entirely unaware that their camera is videoing or taking pictures of them. In some cases, this may go on for an extended amount of time. Many users are shocked to learn that such surreptitious use of their cameras is possible. However, such use is not only possible with current electronic devices, it has become commonplace.

BRIEF SUMMARY

Embodiments described herein are directed to systems and methods for obstructing or preventing light from reaching a light detecting portion of a camera. In one embodiment, a camera obstructing device is described which includes the following: a structural housing that provides support for an obstructing member. The structural housing has at least one channel on which the obstructing member slides from one position to another position. The obstructing member substantially prevents light from reaching the light sensor of the camera. At least one magnet is positioned within the structural housing, where the magnet holds the obstructing member in place in the initial position or the other position.

In another embodiment, a method is provided for preventing light from reaching a light detecting portion of a camera. The method includes fastening a housing structure over a lens portion of the camera. The housing structure provides support for an obstructing member, and has at least one channel on which the obstructing member slides from a first position to a second position. The method next includes causing the obstructing member to slide on the channel substantially over the lens portion of the camera into the second position. The method then includes initializing the camera to begin capturing light at the lens and accessing camera feed data to verify that light is being prevented from reaching the lens portion of the camera.

In another embodiment, a camera obstructing device is described which includes the following: a structural housing that provides support for an obstructing member. The structural housing has at least one rotatable fastener which fastens the obstructing member to the structural housing, and on which the obstructing member pivots from a first position to a second position. The obstructing member substantially prevents light from reaching the light sensor of the camera. At least one magnet is positioned within the structural housing, where the magnet holds the obstructing member in place in the first position.

In another embodiment, a camera obstructing device is described which includes a structural housing configured to provide support for an obstructing member. The structural housing includes a top channel and a bottom channel through which the obstructing member is configured to slide from an open position to a closed position. The obstructing member includes a first raised edge configured to contact a first outside edge of the structural housing when in the open position, and a second raised edge configured to contact a second opposite edge of the structural housing when in the closed position. The obstructing member further includes a first section having an aperture that allows light to reach a light sensor of a camera when placed in the open position, and a second section having blocking material configured to substantially prevent light from reaching the light sensor of the camera when placed in the closed position.

In another embodiment, a camera obstructing device is described which includes the following: a structural housing configured to provide support for an obstructing member. The structural housing includes a frame and an aperture. The frame provides a channel through which the obstructing member is configured to slide from an open position to a closed position. The obstructing member includes a raised edge configured to contact a first interior edge of the structural housing frame when in the open position, and contacts a second interior edge of the structural housing frame when in the closed position. The obstructing member further includes at least a portion of blocking material that substantially prevents light from reaching the light sensor of the camera when placed in the closed position.

In another embodiment, a camera obstructing device is described which includes a structural housing configured to provide support for an obstructing member. The structural housing has at least one rotatable fastener which fastens the obstructing member to the structural housing, and on which the obstructing member pivots from an open position to a closed position. The structural housing includes at least one raised exterior edge configured to support the obstructing member in the closed position. The obstructing member is configured to prevent light from reaching a light sensor of a camera when in the closed position.

In another embodiment, a camera obstructing device is described which includes a substructure configured for mounting on an electronic device. The substructure includes rails positioned substantially parallel relative to each other. The rails are connected via a connecting member. The camera obstructing device also includes an obstructing member configured to slide on the rails from an open position to a closed position. The obstructing member includes an interior extruding portion that is designed to contact the connecting member to prevent movement past the closed position. The obstructing member also includes at least a portion of blocking material configured to substantially prevent light from reaching a light sensor of a camera when placed in the closed position.

In another embodiment, a camera obstructing device is described which includes a structural housing configured to provide support for an obstructing member. The structural housing includes a top channel and a bottom channel through which the obstructing member is configured to slide from an open position to a closed position, a first side edge connected to the top and bottom channels at a first end, where the first side edge is configured to retain an obstructing member when in the closed position, and a second side edge connected to the top and bottom channels at a second end, where the second side edge is configured to retain the obstructing member when in the open position. The obstructing member includes a portion of blocking material configured to substantially prevent light from reaching a light sensor of a camera when placed in the closed position. The obstructing member is configured to slide on the first and second channels between the open position and the closed position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which:

FIG. 2A illustrates an embodiment of a camera obstructing device having an oblong obstructing member in the open position.

FIG. 2B illustrates an embodiment of a camera obstructing device having an oblong obstructing member in the closed position.

FIG. 4A illustrates an embodiment of a camera obstructing device having an antenna, an actuating member and a battery, where the obstructing member is in the open position.

FIG. 4B illustrates an embodiment of a camera obstructing device having an antenna, an actuating member and a battery, where the obstructing member is in the closed position.

FIG. 6 illustrates an embodiment of a camera obstructing device having multiple magnets.

FIG. 7A illustrates a peephole embodiment of a camera obstructing device in the closed position.

FIG. 7B illustrates a peephole embodiment of a camera obstructing device in the open position.

DETAILED DESCRIPTION

Embodiments described herein are directed to systems and methods for obstructing or preventing light from reaching a light detecting portion of a camera. In one embodiment, a camera obstructing device is described which includes the following: a structural housing that provides support for an obstructing member. The structural housing has at least one channel on which the obstructing member slides from one position to another position. The obstructing member substantially prevents light from reaching the light sensor of the camera. At least one magnet is positioned within the structural housing, where the magnet holds the obstructing member in place in the initial position or the other position.

In another embodiment, a method is provided for preventing light from reaching a light detecting portion of a camera. The method includes fastening a housing structure over a lens portion of the camera. The housing structure provides support for an obstructing member, and has at least one channel on which the obstructing member slides from a first position to a second position. The method next includes causing the obstructing member to slide on the channel substantially over the lens portion of the camera into the second position. The method then includes initializing the camera to begin capturing light at the lens and accessing camera feed data to verify that light is being prevented from reaching the lens portion of the camera.

In another embodiment, a camera obstructing device is described which includes the following: a structural housing that provides support for an obstructing member. The structural housing has at least one rotatable fastener which fastens the obstructing member to the structural housing, and on which the obstructing member pivots from a first position to a second position. The obstructing member substantially prevents light from reaching the light sensor of the camera. At least one magnet is positioned within the structural housing, where the magnet holds the obstructing member in place in the first position.

It should be noted that system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
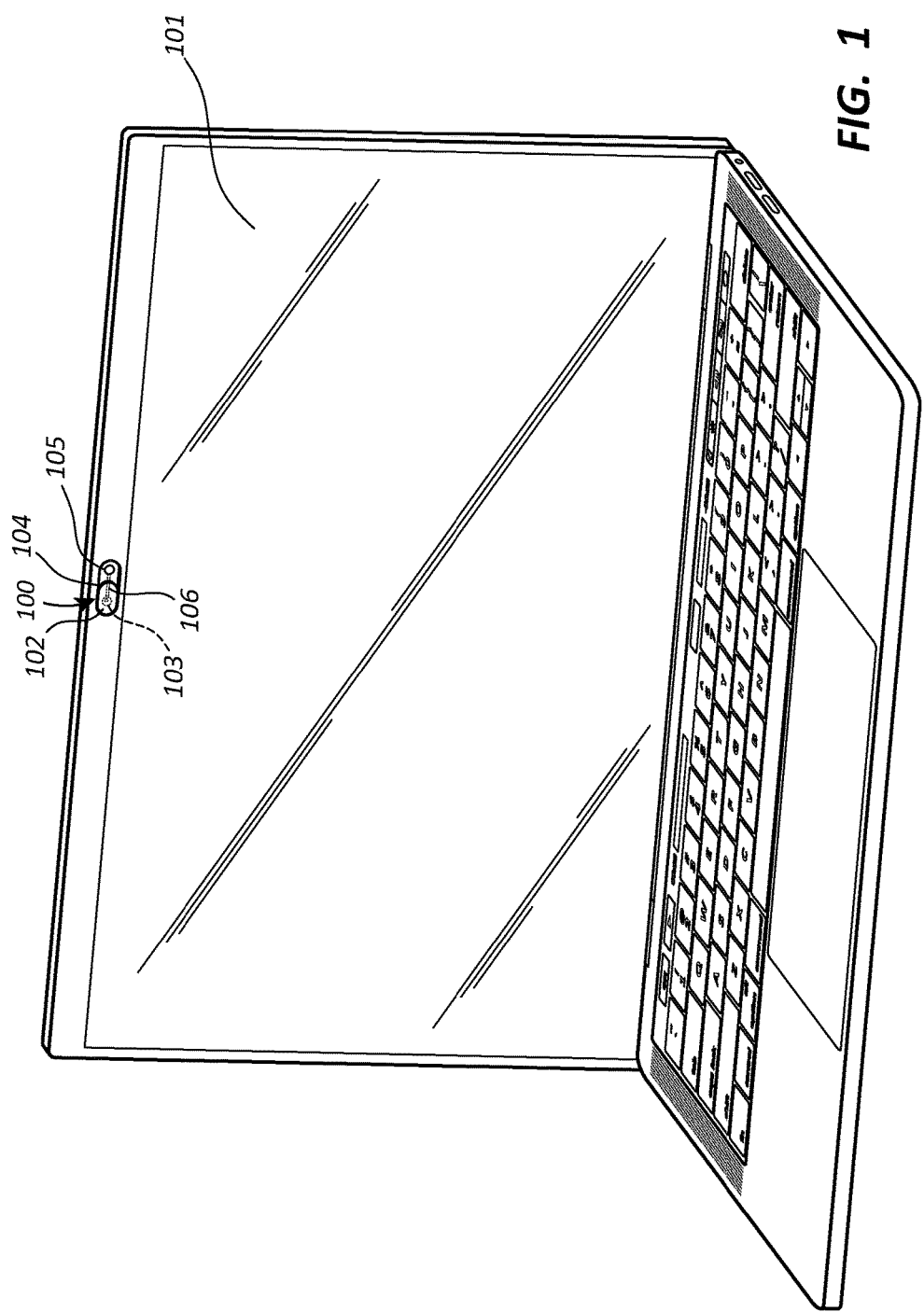
FIG. 1 illustrates an embodiment of a camera obstructing device installed on a laptop computer.

Referring to the figures, FIG. 1 illustrates a laptop computer 101 on which at least one embodiment described herein may be employed. Indeed, it should be recognized that the laptop computer 101 is just one example of a computing device on which the embodiments herein may be used. For instance, the camera obstructing devices described herein may be installed on or affixed to substantially any type of electronic device that has a camera device including a mobile phone, a television, a wearable device, an appliance such as a refrigerator, a desktop computer or any other device including a standalone camera device. While most of the embodiments described herein are non-automated (i.e. manually actuated), it will be understood that in at least some cases, the obstructing member of the camera obstructing device may be actuated via a solenoid according to an input signal, as will be explained further below.

A camera obstructing device 100 of FIG. 1 includes a structural housing 104 that provides support for an obstructing member 102. The structural housing 104 has at least one channel 106 on which the obstructing member 102 slides from a first position to a second position (as shown in FIGS. 2A and 2B). When placed over a camera lens, the obstructing member 102 substantially prevents light from reaching a light sensor of the camera. The camera obstructing device 100 also includes at least one magnet 103 positioned within the structural housing 104. The magnet 103 is configured to hold the obstructing member 102 in place in the first position or the second position.

Thus, as shown in FIG. 2A, when the obstructing member 202 is placed over the magnet 203, the camera obstructing device 200 is in a first, open position in which light can reach through the hole 205 to the light sensor of a camera. When the obstructing member 202 is placed over the hole 205, the camera obstructing device 200 is then in a second, closed position in which light cannot reach the light sensor of the camera. Tracks, guides or channels 206 may be used to hold the obstructing member in place within the device, and may allow the obstructing member 202 to be slid between the open position and the closed position.

Figure 3B:
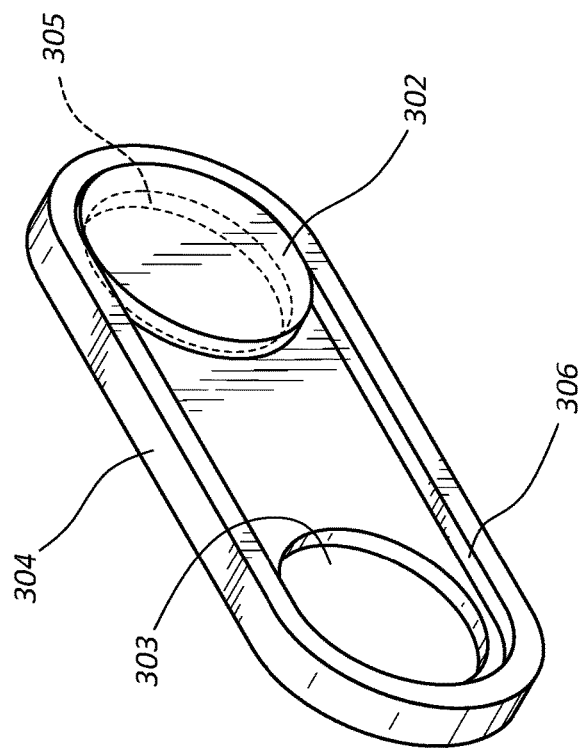
FIG. 3B illustrates an embodiment of a camera obstructing device having a round obstructing member in the closed position.
Figure 3A:
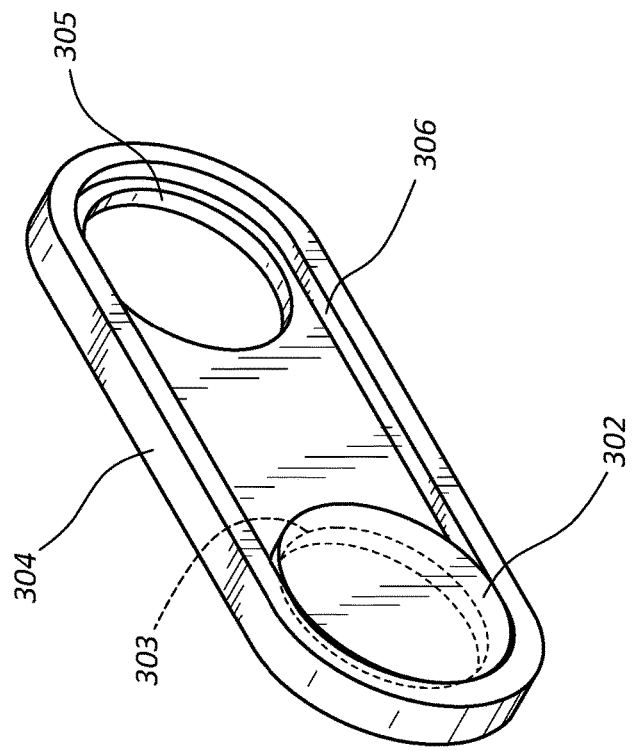
FIG. 3A illustrates an embodiment of a camera obstructing device having a round obstructing member in the open position.

The obstructing member 202 may be substantially any shape or size, and may be configured to block some or all of the view from the camera. As shown in FIGS. 3A and 3B, the obstructing member 302 may be circular shape. The circular obstructing member 302 may be made of a ferrous metal that attaches to (or is held in place by) magnet 303. The circular obstructing member 302 may then be slid along channels 306 into a closed position over the hole 305 that allows light to reach the camera (e.g. 105 of FIG. 1). When in the closed position, light is prevented from reaching the camera. As such, even if the camera is actuated without the knowledge of the user, the camera cannot function as intended as no light reaches the lens. Thus, any surreptitious activation of the camera will be rendered useless.

Although shown as circular in FIGS. 2A-3B, the magnet 203/303 may be substantially any shape or size. Indeed, in the camera obstruction device of FIG. 2A, the magnet 203 may be oblong, and may be shaped similar to or the same as the oblong obstruction member 202. The magnet 203 may be positioned to lock or snap the obstruction member into place in the open position. Thus, once the obstruction member begins to slide away from the closed position, the magnet 203 may grab the obstruction member 202 and lock it in place in the open position. The magnet may be designed with a thickness that is sufficient to hold the obstruction member in place, but thin enough to reduce the weight of the overall device.

The magnet 203 may also be designed to hold the obstructing member 202 within the channel 206. The magnet 203 may be formed of strips or pieces that magnetically hold the obstruction member 202 against the channel 206. These magnetic strips are strong enough to hold the obstruction member against the structure of the device 204, but weak enough to allow the obstruction member to be moved along the channel 206. In some embodiments, the device structure 204 may be designed with an outer lip that prevents the obstruction member from falling out. The outer lip also allows movement of the obstruction member 202 from the open position to the closed position. In cases where an outer lip is implemented, the magnet 203 used may be thinner or smaller, thus reducing the weight of the camera obstructing device.

In some embodiments, the obstructing member may be actuated by hand. That is, a user may physically move the obstructing member from the open position to the closed position, or vice versa. In other embodiments, the obstructing member may be actuated mechanically or electrically. For instance, as shown in FIG. 4A, the obstructing member 402 may have a solenoid 408 installed thereon. When activated, the solenoid moves the obstructing member 402 from the open position to the closed position, or from the closed position to the open position. The solenoid 408 may be powered by a battery 409 or by a wired power source (e.g. from the electronic device). The battery may be installed on the obstructing member 402, or may be installed elsewhere on the camera obstructing device support structure 404. The solenoid 408 may be actuated via a wired or wireless signal.

For example, the camera obstructing device may include an antenna 407 configured to receive wireless signals. The antenna 407 may thus receive an initiating wireless signal, and trigger activation of the solenoid upon reception of the signal. The wireless signal may be received over WiFi, Bluetooth, infrared or some other waveform. The wireless signal may, for example, be sent out from a phone or from a wearable device. A user of a laptop (e.g. 101 of FIG. 1) may thus use a wearable electronic device such as a watch to send a signal to the camera obstructing device indicating that the obstructing member is to be actuated and moved from an open to a closed position, or vice versa. The camera obstructing device may also include a microcontroller configured to determine the open or closed state of the device, based on the position of the obstructing member, and transmit a message over the antenna 407 back to the phone or watch indicating that the laptop camera is indeed working or is closed.

In some cases, the magnet 403 is an electromagnet. As such, the magnetic fields of the electromagnet can be generated when an electric current is applied. Such an electromagnet could be positioned such that when electrical current is running through the magnet, the ferromagnetic obstructing member would slide to the open position, allowing the camera 401 to receive light, and when no current is running through the electromagnet, the obstructing member 402 would slide to the closed position. Other electromagnet configurations may also be used, including providing multiple electromagnets on the same device. The electromagnet may be powered using the battery 409 or some other power source, and may be initialized according to an incoming signal received on the antenna 407.

The structural housing 404 of the camera obstructing device may be affixed to the electronic device using an adhesive that is optimized for adherence to devices. For instance, if the camera obstructing device is made of plastic, and the electronic device is made of plastic or metal, the adhesive used to attach the structural housing 404 to the electronic devices may be one that is designed to bind plastic to plastic or metal. Similarly, if the camera obstructing device is made of metal, and the electronic device's surface is made of glass, the adhesive used may be designed to bind metal to glass, and so on. The adhesive may be designed to withstand a wide range of temperatures and environments so that, in the case of wearable devices that are exposed to heat, cold, rain and even submersion, the adhesive will still hold properly.

Figure 5A:
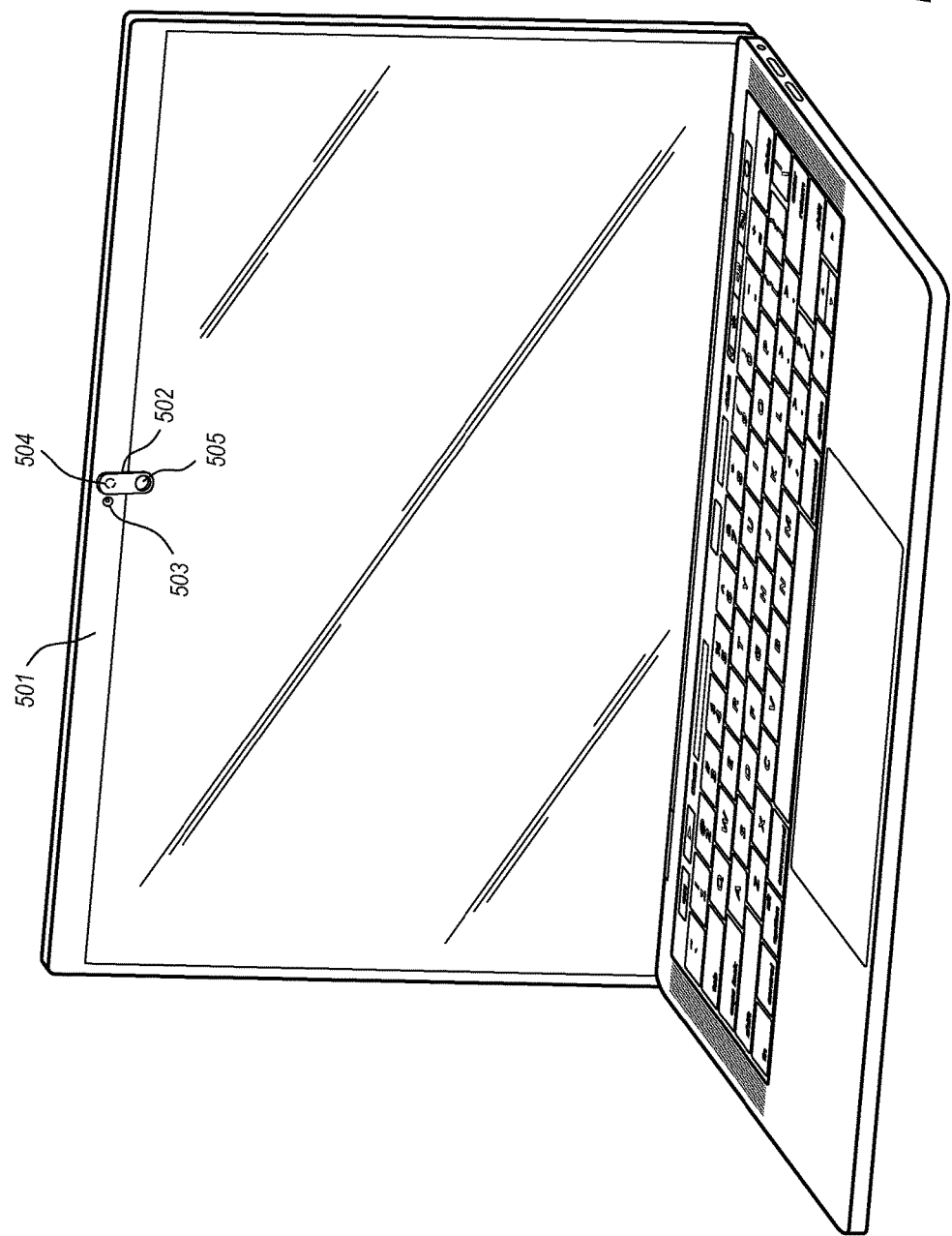
FIG. 5A illustrates an alternative embodiment of a camera obstructing device installed on a laptop computer, where the obstructing member is swiveled to the open position.
Figure 5B:
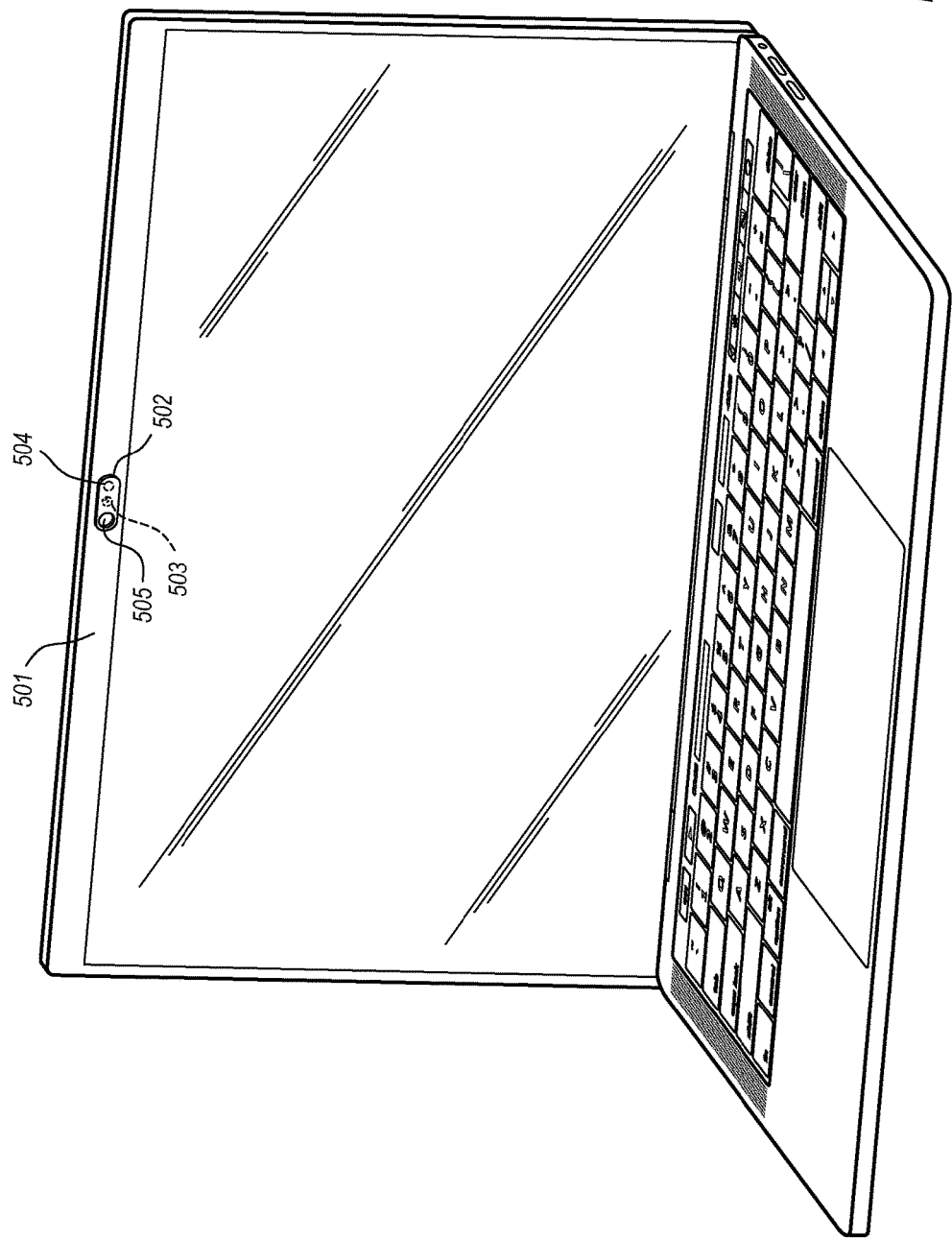
FIG. 5B illustrates an alternative embodiment of a camera obstructing device installed on a laptop computer, where the obstructing member is swiveled to the closed position.

FIG. 5A illustrates an embodiment in which the camera obstructing device is a swivel-based design. The swivel-based device 502 may be attached to a laptop or other electronic device at a rotatable junction 504. The swivel-based device 502, in the down position (FIG. 5A), allows light to reach the camera 503. In the up position (FIG. 5B), the obstructing member 505 substantially prevents light from reaching the camera 503. Optionally, the obstructing member 505 may be slidable along a channel, and may be secured in place using magnets (as described above in FIGS. 2A-3B). Alternatively, the obstructing member 505 may be a solid portion that is not slidable.

FIG. 6 illustrates an embodiment in which a camera obstructing device implements two magnets. The device's support structure 604 holds two magnets 603 and 610. The obstructing member 605 may be oblong shaped, and may slide along channel 606. Multiple magnets may be used to hold the obstructing member in different positions. The magnet 603 may hold the obstructing member 605 in place in a first, open position that allows light to reach the camera. The second magnet 610 may hold the obstructing member 605 in a closed position that prevents light from reaching the camera. The magnets may be positioned on opposite sides of the camera, or with both magnets to the side of the camera (as shown). It should be understood that three, four or more magnets may be used in a camera obstructing device, depending on desired design features.

When magnets are used in the camera obstructing devices, the magnets may be coated with a printable material. This printable material allows company's logos or other letters or symbols to be printed thereon. This allows companies to personalize the camera obstructing devices and use the devices as promotional material. Additionally or alternatively, the obstructing members of the camera obstructing devices may be etched using metal etching techniques.

FIGS. 7A and 7B illustrate another embodiment of a camera obstructing device 702. The camera obstructing device 702 has a front obstructing member 701 that blocks the camera 703 in the down position (FIG. 7A), and allows light to reach the camera in the up position (FIG. 7B). The camera obstructing device 702 has a structural housing that provides support for the obstructing member 701. The structural housing has a rotatable fastener which fastens the obstructing member 701 to the structural housing. The obstructing member pivots from a closed position in FIG. 7A to an open position in FIG. 7B. The obstructing member 701 prevents light from reaching a light sensor of the camera 703. The embodiment of FIGS. 7A and 7B may not have a magnet. The obstructing member 701 may be held in place due to friction in the rotatable fastener.

In embodiments where the obstructing member is designed to swivel or rotate, the obstructing member may be moved manually (e.g. by a user's hand), or may be moved using an electronically actuated solenoid. Then, upon actuation, the obstructing member swivels from the open position to the closed position, or vice versa. Similar to the sliding embodiments, the swivel or rotating embodiments may also have a battery, solenoid and antenna, along with other components such as a microprocessor configured to determine the current position of the obstructing member and generate messages to communicate that position to users or other recipients.

An antenna may be integrated into the support structure or the obstructing member of the camera obstructing device. The antenna may receive an actuation signal and a relay (also integrated into the device) may be configured to relay the received signal to an electronic actuating means. That electronic actuating means may include a solenoid, an electromagnet, or other means of sliding, swiveling or rotating the obstructing member. One or more magnets may be used to hold the obstructing member at different positions on the camera obstructing device. Some or all of the magnets may be electromagnets which are designed to create a magnetic field when a current is applied. Thus, use of an electronic actuating means may allow the camera of an electronic device to be open or blocked, simply by sending a signal to the electronic actuating means.

Figure 8:
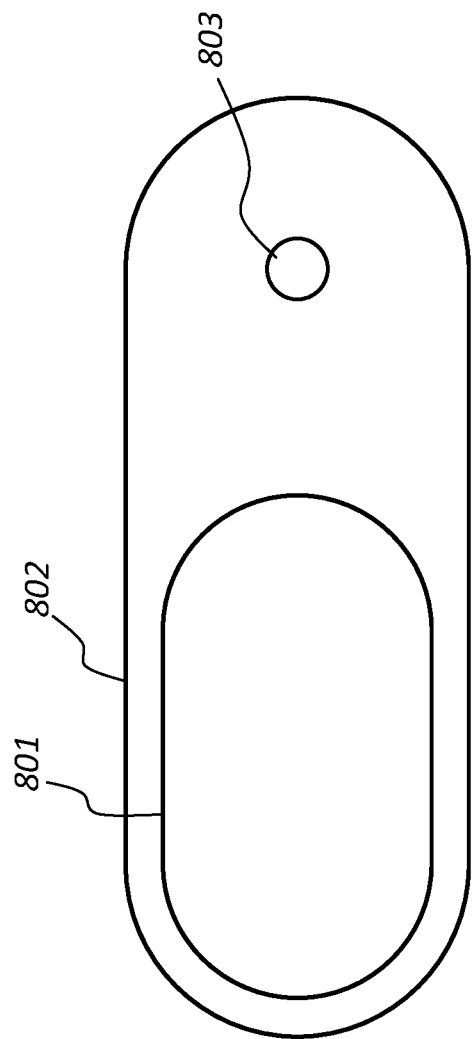
FIG. 8 illustrates a substantially flat embodiment of a magnetic camera obstructing device in the open position.

In some embodiments, as shown in FIG. 8, a substantially flat camera obstructing device may be provided. The device includes a flat structural body 801 that lacks channels or grooves. The flat structural body 801 may be made of a ferrous metal, such that a magnet or an obstructing member 802 that contains a magnet may be magnetically attached thereto. The magnetic obstructing member 802 can slide between open and closed positions, as described above. When in the open position, the camera lens 803 will still receive light, while in the closed position, with the obstructing member 803 slid over the camera lens, no light will reach the lens. In this embodiment, the obstructing member 802 lacks guiding channels and, as such, may be easier to slide between open and closed positions. The above concepts will be explained further below with regard to method 900 of FIG. 9.

Figure 9:
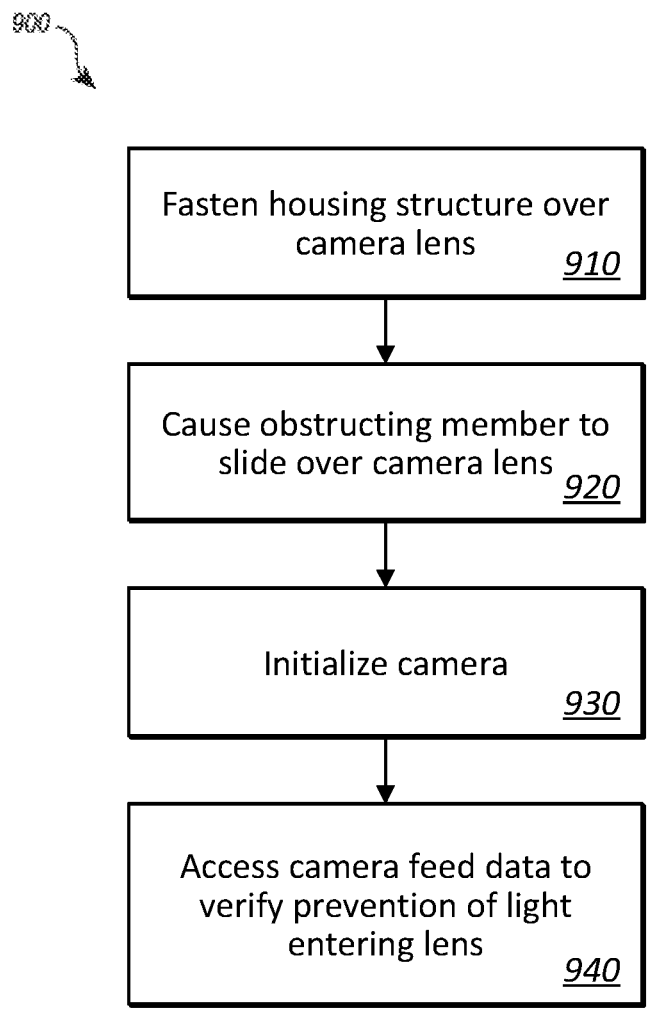
FIG. 9 illustrates a flowchart of an example method for preventing light from reaching a light detecting portion of a camera.

In view of the systems and architectures described above, methodologies that may be implemented in accordance with the disclosed subject matter will be better appreciated with reference to the flow chart of FIG. 9. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 9 illustrates a flowchart of a method 900 for preventing light from reaching a light detecting portion of a camera. The method 900 will now be described with general reference to the components and data of FIGS. 1-8.

Method 900 includes fastening at least a portion of a housing structure over a lens portion of a camera, the housing structure being configured to provide support for an obstructing member, the structural housing having at least one channel on which the obstructing member slides from a first position to a second position (910). For example, the housing structure 104 may be fastened onto the laptop 101 of FIG. 1. The housing structure has an obstructing member 102 that can slide along a channel 106. The channel 106 may be along an inside edge (as shown in FIG. 1), or along an outside edge (as shown in FIG. 2A). The obstructing member 102 slides from an open position over a magnet 103 (where the outside light can reach through the hole 105 to the camera) to a closed position where outside light cannot penetrate to the camera. This prevents operation of the camera, even if it is turned on.

Method 900 includes causing the obstructing member to slide on the channel substantially over the lens portion of the camera into the second position (920). As shown in FIGS. 4A and 4B, the camera obstructing device 404 may include a solenoid 408 powered by a battery 409. Upon receiving an actuation signal (e.g. via antenna 407), the solenoid 408 may cause the obstructing member to slide on channel 406 from an open position (FIG. 4A) to a closed position (FIG. 4B) in which the camera is blocked. At this point, the camera may be initialized to begin capturing light at the lens (930). Camera feed data from the electronic device may then be accessed to verify that light is being prevented from reaching the lens portion of the camera (940). For example, if the obstructing member is in the closed position of FIG. 4B, the camera feed data will be substantially black or blank, as light to the camera will be blocked by the obstructing member 402.

As shown in FIG. 4B, the camera obstructing device 404 may include a magnet 403 that locks the obstructing member 402 into place when slid into the open position. A latch or lip may be implemented on the device to hold the obstructing member 402 in place in the closed position. When in place, the obstructing member prevents camera recording even when the camera is turned on. The camera feed data may be analyzed by a user or by a computer algorithm to verify that the camera feed data is not capturing surrounding light. If the verification process fails (i.e. a threshold level of light is detected in the camera feed data), then the user of the electronic device may be notified via a graphical user interface or other indication. The graphical user interface may alert the user that the obstructing member is not in the proper position and that at least some amount of light is still being captured by the camera.

The housing structure may be fastened over the lens of the camera using an adhesive optimized for adherence to electronic devices. Thus, the housing structure 204 of FIG. 2 may be fastened to the laptop 101 of FIG. 1 using an adhesive that attaches well to plastic. Once in position, a user may switch the obstructing member 202 between positions, or a solenoid or other actuating means may be implemented to move the obstructing member between open and closed positions. The solenoid may be powered via a battery or via a wired power source, and may be triggered via a wireless signal or via a wired signal.

Figure 10A:
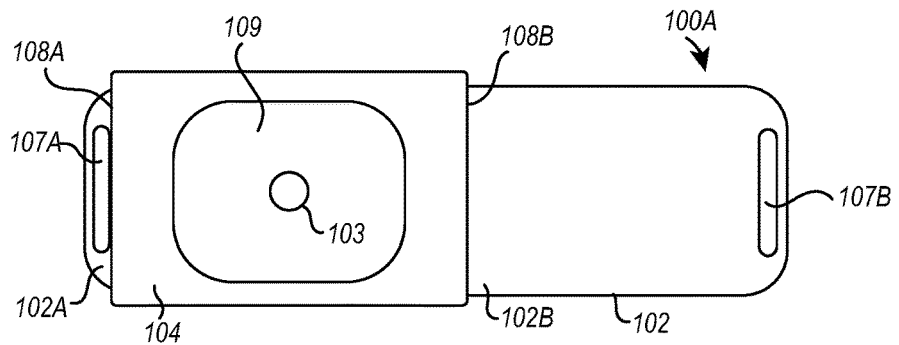
FIGS. 10A and 10B illustrate embodiments of a camera obstructing device in an open position and a closed position, respectively.
Figure 10B:
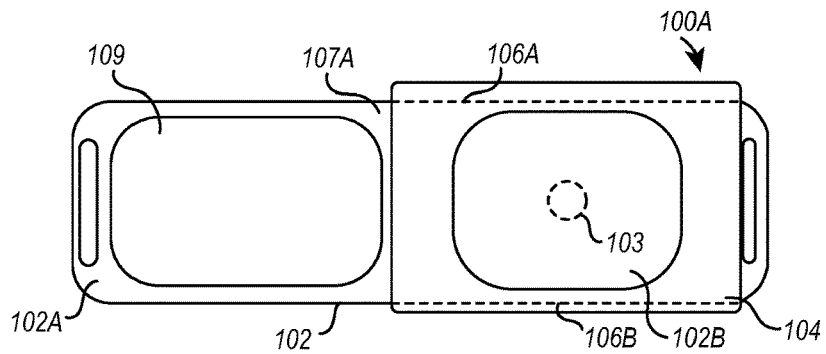

Turning now to FIGS. 10A and 10B, a camera obstructing device 100A is shown. The camera obstructing device 100A is designed to allow a user of an electronic device to easily access or prevent operation of a digital camera. The camera obstructing device 100A includes a structural housing 104 that provides support for an obstructing member 102. The structural housing 104 includes a top channel 106A and a bottom channel 106B through which the obstructing member 102 slides from an open position (shown in FIG. 10A) to a closed position (shown in FIG. 10B). In the open position, the camera lens 103 is visible and, as such, light waves can reach the camera and be recorded by the corresponding electronic device. In the closed position, the camera lens 103 is blocked by the obstructing member 102 and no light can reach the camera lens 103. Thus, even if the camera is turned on, it will not record any light and thus cannot invade a user's privacy.

The obstructing member 102 of the camera obstructing device 100A includes multiple features including at least the following: a first raised edge 107A that contacts a first outside edge 108A of the structural housing 104 when in the open position (e.g. in FIG. 10A). The obstructing member 102 also includes a second raised edge 107B that contacts a second opposite edge 108B of the structural housing 104 when in the closed position (e.g. in FIG. 10B). Still further, the obstructing member 102 includes a first section 102A that has an aperture 109 that allows light to reach the light sensor of a camera 103 when placed in the open position, and also has a second section having blocking material 102B that substantially prevents light from reaching the light sensor of the camera 103 when placed in the closed position.

The aperture 109 in the first section 102A of the obstructing member 102 may be of various sizes or shapes. The aperture need only be big enough to allow light to reach the camera 103. The blocking material in the second section 102B of the obstructing member 102 may be made of substantially any type of material, including plastic, metal, wood, composite materials, or other materials. In some cases, the materials may be laser etched or may be coated with a printable material. This allows corporations or other entities to print logos on the obstructing member. This will be explained further below with regard to FIGS. 17A-17E.

The obstructing member 102 may also be interchangeable with other obstructing members. For example, the obstructing member 102 may be popped out or snapped out from between the top and bottom channels 106A/106B. Once snapped out, a new obstructing member 102 may be snapped into place between the top and bottom channels. Such interchangeable obstructing members may be used in each of the embodiments 100A-100E, although the obstructing member would be shaped differently in the different embodiments. Thus, if a user purchased a webcam cover and wanted to select a different obstructing member (perhaps with a different logo, or perhaps because the obstructing member broke), the user could simply interchange the old obstructing member for a new one.

The structural housing 104 may be fastened over a lens of the camera using an adhesive optimized for adherence to electronic devices. The adhesive allows the structural housing 104 to properly adhere to the surface of the electronic device, whether it is a phone, tablet, laptop, PC or other device. The adhesive holds the structural housing 104 next to the electronic device in a manner that allows for a gap between the webcam cover and the camera lens. This prevents the camera lens from getting scratched or worn by movement of the webcam cover.

The structural housing 104 may be made of silicone, rubber, foam, plastic, or any other type of soft, semi-soft or spongy material that depresses on contact. In some cases, the structural housing 104 may be made partly of one material (e.g. silicone) and partly of another material (e.g. plastic), or some other combination of materials. In other cases, the structural housing 104 may be made of harder materials such as metal, wood or composite materials. In like manner, the obstructing member 102 may also be made out of any of the above-listed materials, or any combination of the above-listed materials, or in combination with other materials. Thus, in any of the embodiments described herein, including embodiments 100A-100E, the structural housing 104 and the obstructing member 102 may each be made, in whole or in part, out of any of the above-listed materials or other similar materials.

Figure 11A:
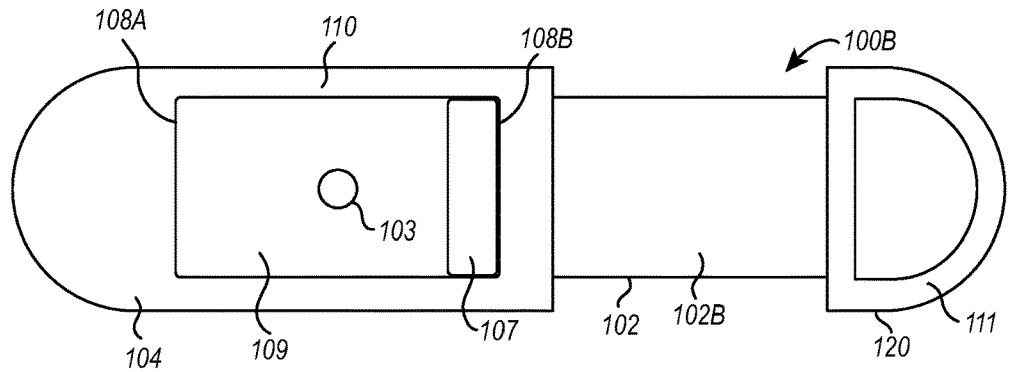
FIGS. 11A and 11B illustrate alternate embodiments of a camera obstructing device in an open position and a closed position, respectively.
Figure 11B:
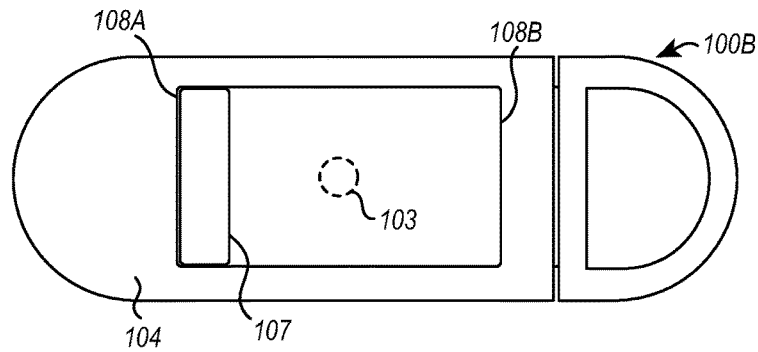

Another webcam cover embodiment is illustrated in FIGS. 11A and 11B. The webcam cover 100B is shown in the open position in FIG. 11A, and in the closed position in FIG. 11B. Thus, in FIG. 11A, the camera lens 103 is visible and functional, while in FIG. 11B, the camera lens 103 is blocked and the camera is not functional. The webcam cover 100B includes a structural housing 104 that provides support for the obstructing member 102. The structural housing 104 includes a frame 110 and an aperture 109. The frame 110 provides a channel through which the obstructing member 102 is configured to slide from an open position (e.g. FIG. 11A) to a closed position (e.g. FIG. 11B).

The obstructing member 102 includes a raised edge 107 that contacts a first interior edge 108B of the structural housing frame 110 when in the open position. The raised edge 107 also contacts a second interior edge 108A of the structural housing frame 110 when in the closed position. Thus, as shown in FIG. 11A, when the obstructing member 102 has been pulled to the right in the open position, the raised edge 107 contacts the interior edge 108B, which stops movement of the obstructing member 102. When the obstructing member 102 has been pushed to the left in the closed position in FIG. 11B, the raised edge 107 contacts the interior edge 108A, which stops movement of the obstructing member 102. Additionally or alternatively, the grip portion 111 of the obstructing member 102 may contact the frame 110 of the structural housing 104 to stop movement of the obstructing member.

The obstructing member 102 includes at least a portion of blocking material 102B that substantially prevents light from reaching the light sensor of the camera 103 when the obstructing member is placed in the closed position. The obstructing member 102 has a grip portion 111 that may be sized and shaped differently depending on the embodiment. In the embodiment shown in FIGS. 11A and 11B, the grip portion 111 includes a raised edge 120 that substantially surrounds the grip portion. This raised edge provides a better grip for a finger, allowing the finger to better grab hold of the obstructing member 102. When closed, both the grip portion 111 and the raised edge 107 may come into contact with the structural housing, thereby securing the obstructing member in place in the closed position. In some embodiments, notches or clasps may be used to lock the obstructing member 102 into place when in the open or closed position. This will be explained further below with regard to FIG. 13.

Figure 12A:
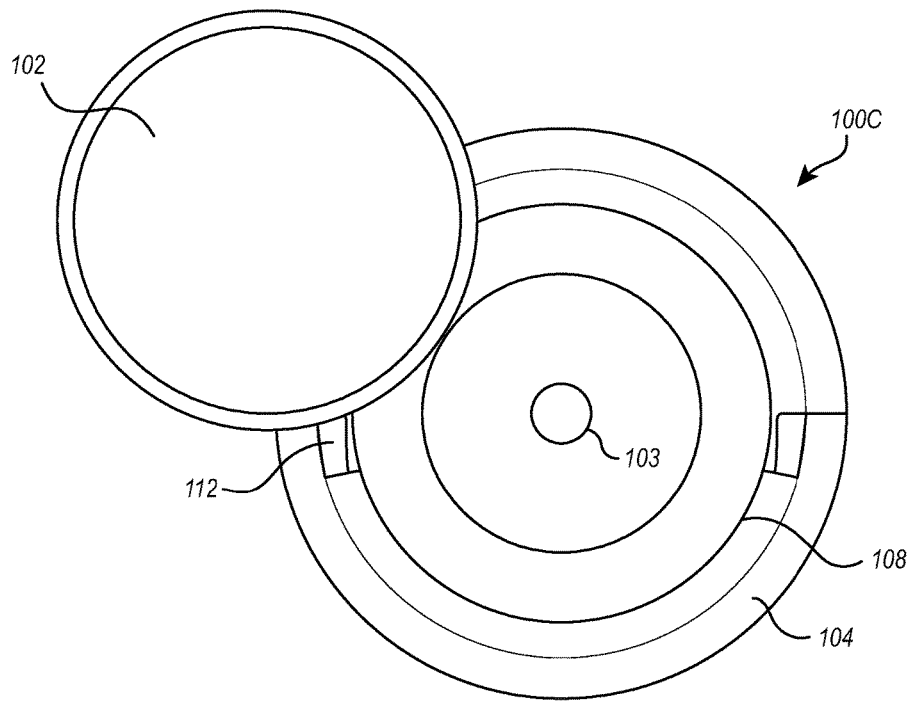
FIGS. 12A and 12B illustrate embodiments of an alternate camera obstructing device in an open position and a closed position, respectively.
Figure 12B:
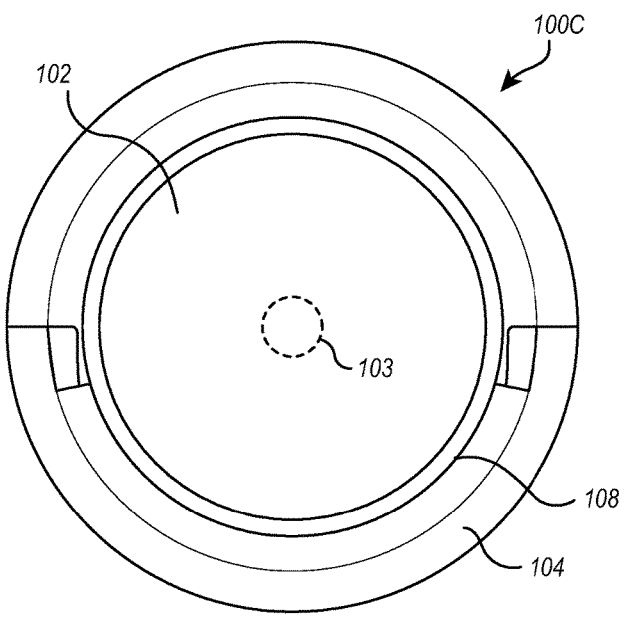

FIGS. 12A and 12B illustrate a camera obstructing device 100C that includes components for blocking or allowing access to a camera in an electronic device. The camera obstructing device 100C includes a structural housing 104 that provides support for an obstructing member 102. The structural housing 104 has at least one rotatable fastener 112 that fastens the obstructing member 102 to the structural housing. In addition to fastening the obstructing member 102 to the structural housing, the rotatable fastener 112 allows the obstructing member 102 to pivot from an open position to a closed position. FIG. 12A shows the camera obstructing device 100C in the open position, with the camera 103 visible and functional. In FIG. 12A, the obstructing member 102 has been rotated on hinge 112 to the open position. In FIG. 12B, the obstructing member 102 has been rotated on hinge 112 to the closed position. In this closed position, the obstructing member 102 blocks light from reaching the camera 103.

The structural housing 104 of the camera obstructing device 100C includes at least one raised exterior edge 108 that supports and holds the obstructing member 102 in the closed position. The obstructing member 102 rests on the raised exterior edge 108 when pushed down in the closed position by a user. The raised exterior edge 108 also prevents the obstructing member 102 from being pushed too far downward and allowing light to reach the camera 103. When properly positioned on the raised exterior edge 103, the obstructing member 102 prevents light from reaching the camera and thus, even if the camera is surreptitiously turned on, the camera will not record any useful data—merely the backside of the obstructing member 102.

The rotatable fastener 112 of the camera obstructing device 100C provides sufficient rotational resistance to hold the obstructing member in the open position. The rotatable fastener 112 may thus be designed and engineered to have rotational resistance between its moving parts. This resistance is designed to be enough to hold the obstructing member 102 in place in the open position, but not so much that rotation is prevented.

Figure 13:
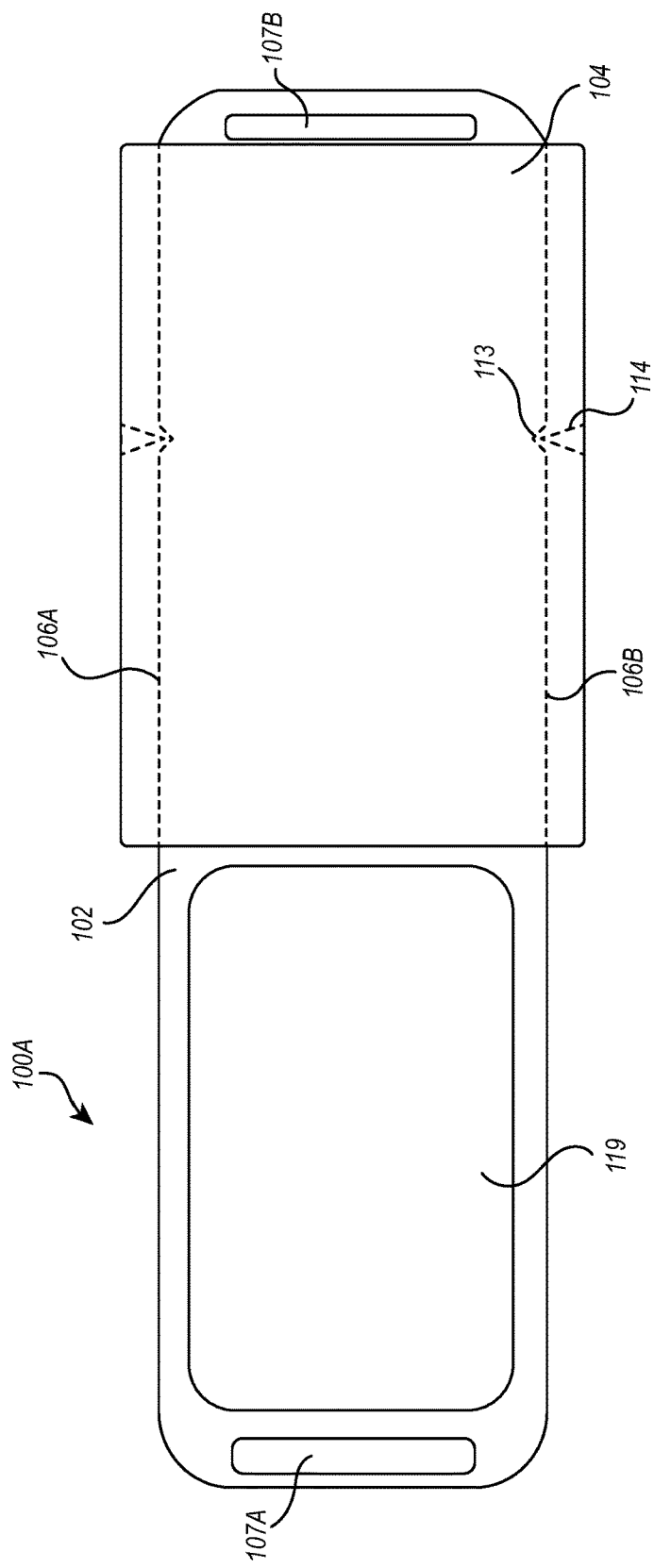
FIG. 13 illustrates an embodiment of a camera obstructing device having notches for locking the obstructing member into position.

In some embodiments, the structural housing 104 of the camera obstructing device 100C includes a notch that holds the obstructing member 102 in place in the open position. The notch may align with a raised edge of the obstructing member 102. When the raised edge is inserted into the notch, the obstructing member 102 will be held in position. As shown in FIG. 13, any of the embodiments 100A-100E (including the illustrated 100A) may include bumps 114 and notches 113 that hold the obstructing member 102 in place. In embodiment 100A, for example, the top and bottom channels 106A/106B may each have a notch 113 carved out of a portion of the channel. The raised edges or bumps 114 of the structural housing 104 may align with the notches 113 of the channels 106A/106B. Thus, when the obstructing member 102 is in the open position, it may be held there by the bumps and notches.

It will be understood that many other embodiments are contemplated here. Indeed, raised edges or bumps may be formed into the obstructing member 102, and corresponding notches may be placed in the structural housing. The edges and notches may be placed in substantially any position in the structural housing, or in any position on the obstructing member 102. The edges and notches may be in different positions, for example, on the top channel 106A, and on the bottom channel 106B to force a proper alignment.

In some cases, a first notch is provided on a surface of the top channel 106A and a second notch is provided on a surface of the bottom channel, where the first notch holds the obstructing member in place in the open position, and the second notch holds the obstructing member in the closed position. More or fewer than two edges/notches may be used in any given webcam cover. Moreover, these edges/notches may be used to lock the obstructing member 102 in a closed position or in an intermediate position between open and closed. Other embodiments may use snaps, pins, clasps or other mechanical or electromechanical means of locking or securing the obstructing member 102 in a given position relative to the structural housing 104.

Figure 14:
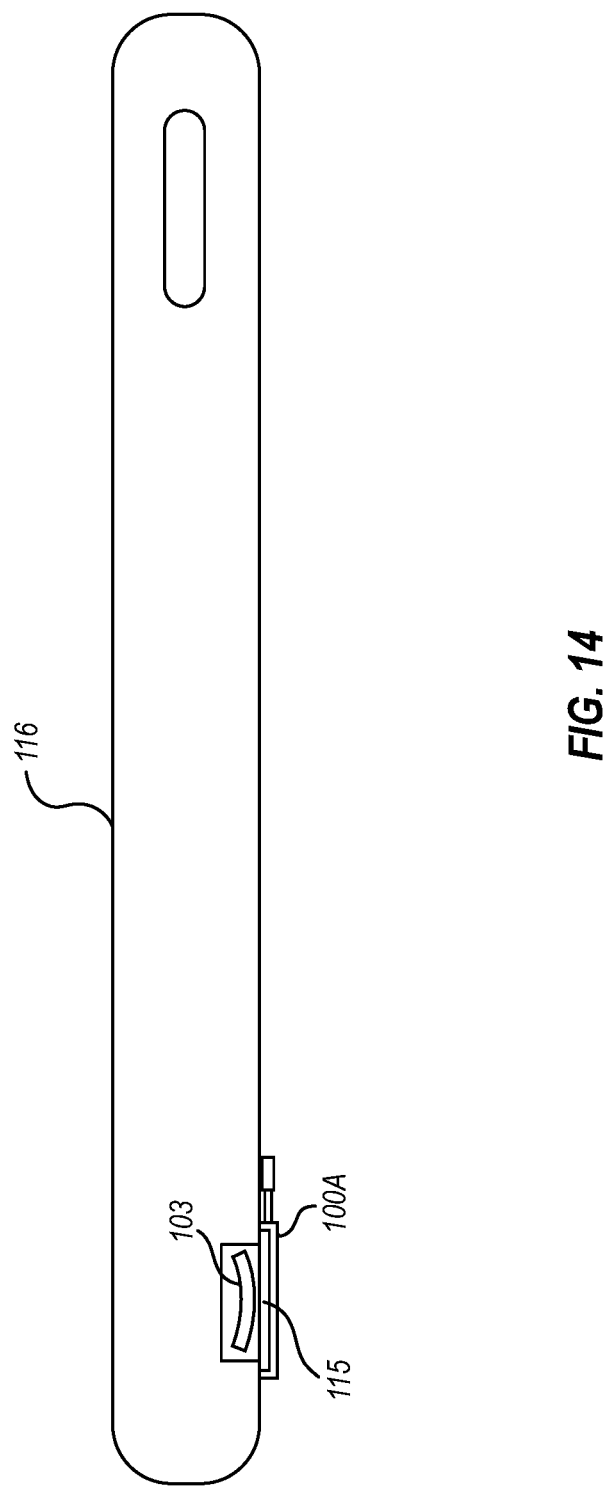
FIG. 14 illustrates a top view of an embodiment of a camera obstructing device that is mounted over an electronic device's camera.

FIG. 14 illustrates an embodiment of a top view of an electronic device 116 that has a webcam cover installed over the camera. In the example illustrated in FIG. 14, the webcam cover 100A is used, although it will be recognized that any of the webcam covers described herein may be used. The webcam cover 100A is installed over the camera 103 so that, upon actuation of the obstructing member 102, the camera 103 is either blocked or unblocked. The webcam cover 100A may be adhered to the cover using an adhesive specifically designed for adherence to an electronic device. The structural housing of the webcam cover 100A is designed to provide a specified gap 115 between the obstructing member and the camera 103. The gap between the obstructing member 102 and the camera 103 is provided by a raised outer edge on the top channel 106A and the bottom channel 106B. This prevents the camera from being scratched by movement of the obstructing member 102.

Figure 15A:
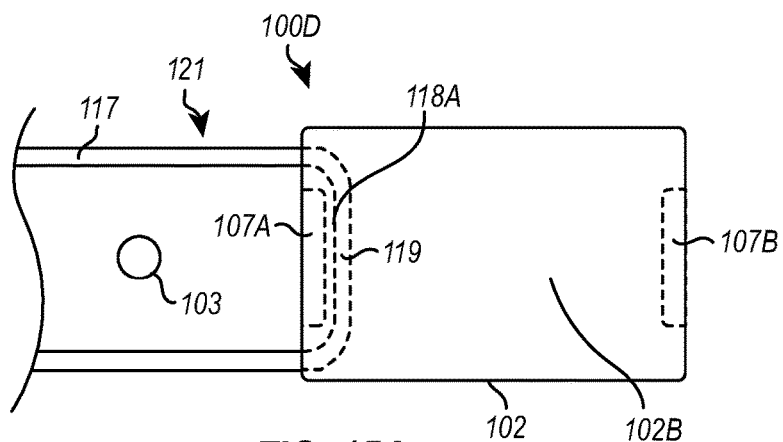
FIGS. 15A and 15B illustrate embodiments of an alternate camera obstructing device in an open position and a closed position, respectively.
Figure 15B:
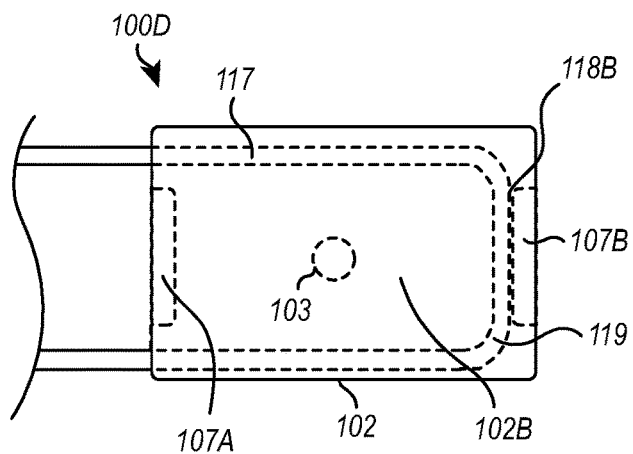

FIGS. 15A and 15B illustrate a camera obstructing device 100D that includes a substructure 121 that can be mounted on an electronic device (e.g. 116 of FIG. 14). The substructure 121 includes rails 117 positioned substantially parallel relative to each other. The rails 117 are connected via a connecting member 119. Together, the rails and the connecting member(s) form the substructure 121. The camera obstructing device 100D also includes an obstructing member 102 that slides on the rails from an open position (as shown in FIG. 15A) to a closed position (as shown in FIG. 15B). The obstructing member 102 includes an interior extruding portion 107A that is designed to contact the connecting member 119 to prevent movement past the closed position. The obstructing member 102 also includes at least some blocking material 102B that substantially prevents light from reaching a light sensor of a camera 103 when placed in the closed position.

The obstructing member 102 may also have an exterior extruding portion 107B that prevents the obstructing member 102 from extending past the closed position. Indeed, the exterior extruding portion 107B extends below the obstructing member 102 and contacts the connecting member 119 when in the closed position. In some embodiments, each end of the rails 117 has a connecting member 119. In such embodiments, the interior extruding portion 107A would contact the connecting member 119 when in the open position, and in the closed position, the exterior extruding portion 107B would contact the connecting member 119, and the interior extruding portion 107A would contact the second connecting member (not shown). The obstructing member 102 may have channels that attach the obstructing member to the rails 117. Such channels may be the same as or similar to channels 106A and 106B of FIG. 10A.

In some cases, the obstructing member 102 may be laser etched according to a specified design. The obstructing member 102 may thus be shaped in substantially any shape, or may consist of letters that spell a name or word. The obstructing member 102 may extend past the base in any direction to provide extra material to work with for a given design. Thus, the obstructing member 102 may be laser etched in the form of substantially any object, whether animate or inanimate, and may include different colors or prints. Indeed, in some embodiments, the obstructing member 102 is formed using a printable plastic (e.g. Acrylonitrile Butadiene Styrene (ABS)) or printable metal. Thus, when the obstructing member 102 is printed and laser etched, it can take on any design, shape, size or logo.

Figure 16A:
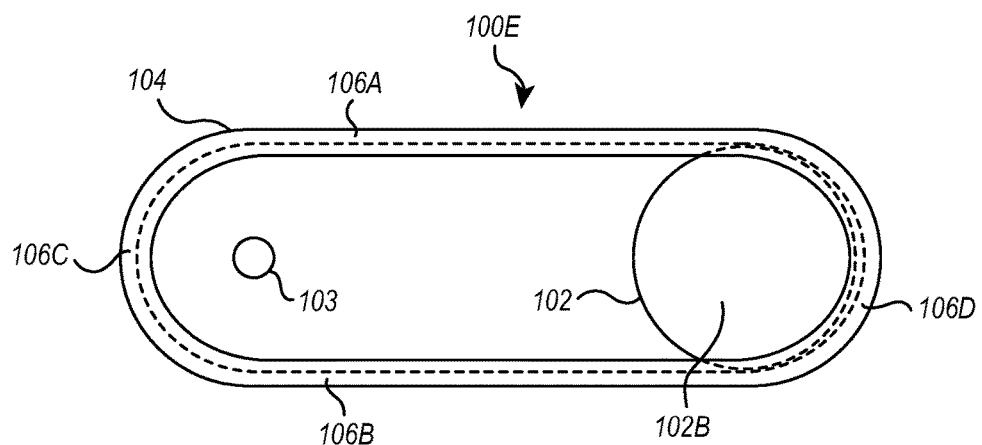
FIGS. 16A and 16B illustrate embodiments of an alternate camera obstructing device in an open position and a closed position, respectively.
Figure 16B:
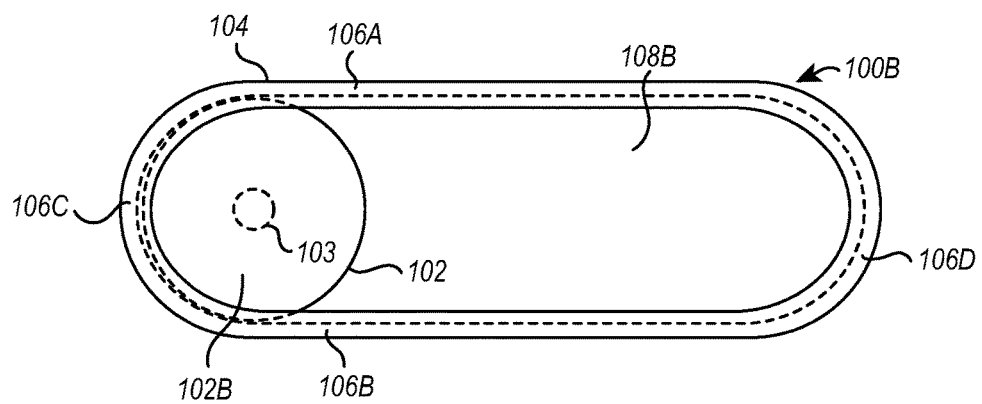
Figure 17A:
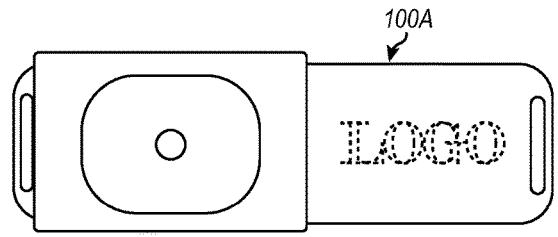
FIGS. 17A-17E illustrate embodiments of camera obstructing devices with logos placed thereon.
Figure 17B:
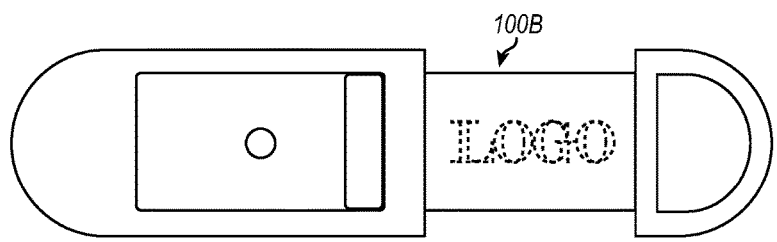
Figure 17C:
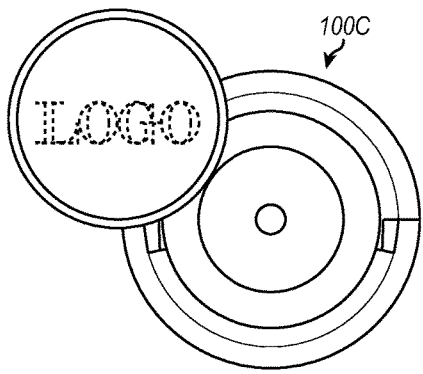
Figure 17D:
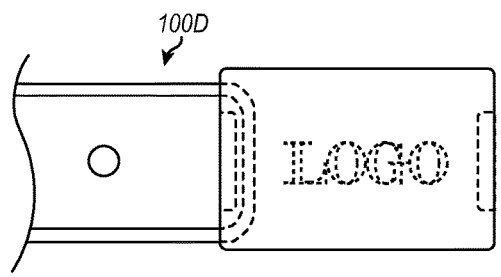
Figure 17E:
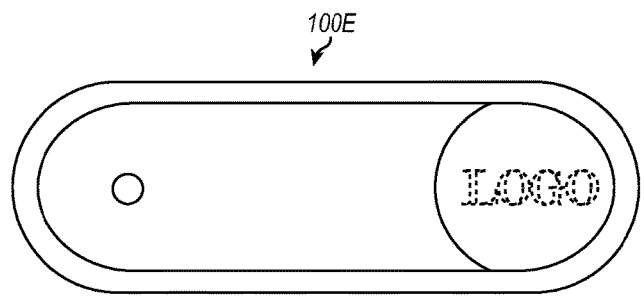

FIGS. 16A and 16B illustrate a camera obstructing device 100E that includes the following: a structural housing 104 that provides support for an obstructing member 102. The structural housing has a top channel 106A and a bottom channel 106B through which the obstructing member 102 slides from an open position (e.g. in FIG. 16A) to a closed position (in FIG. 16B). The structural housing further includes a first side edge 106C connected to the top and bottom channels at a first end, where the first side edge 106C is configured to retain the obstructing member 102 when in the closed position, and a second side edge 106D connected to the top and bottom channels at a second end, where the second side edge is configured to retain the obstructing member 102 when in the open position. The obstructing member 102 includes blocking material 102B that substantially prevents light from reaching a light sensor of a camera 103 when the obstructing member 102 is placed in the closed position.

The obstructing member slides on the channels 106A and 106B between the open position and the closed position, as shown in FIGS. 16A and 16B. The top and bottom channels 106A and 106B, as well as the first and second side channels 106C and 106D include a lip that holds the obstructing member 102 in place within the structural housing 104. Thus, the lip keeps the obstructing member 102 from falling forward out of the housing toward the user. The obstructing member may be configured to snap into place between the top channel 106A and the bottom channel 106B. Once snapped into place, the lip on the channels 106A-106D will hold the obstructing member 102 in place. The obstructing member may be reversible and/or interchangeable and, as such, the obstructing member can be unsnapped, flipped and re-snapped into place between the top and bottom channels.

In some embodiments, the structural housing 104 and obstructing member 102 may be designed for placement over a microphone on an electronic device. As in cases where the obstructing member 102 covers a camera, the obstructing member may be designed to cover one or more microphones when in the closed position, substantially preventing the microphone from receiving sound waves. Similarly, the structural housing and obstructing member may be designed for placement over a speaker of an electronic device. In such cases, the obstructing member muffles sound waves emitted from the speaker when in the closed position. The obstructing member may be designed and shaped differently in cases where a microphone or speaker are to be covered. Thus, even if a microphone or speaker is turned on surreptitiously, the microphone or speaker will not function as intended, as all or most of the sound signals will be blocked by the obstructing member.

FIG. 17 illustrates each of the webcam cover embodiments 100A-100E with a logo printed or etched thereon. Each of these embodiments includes a logo on the outer portion of the obstructing member. This logo may include a word or words, or may be in the shape of a picture. In some cases, the logo is a company logo that has been printed on the obstructing member or laser etched onto the obstructing member. In some cases, the obstructing member may be reversible, and may have a logo printed or etched onto the reverse side of the obstructing member. Thus, companies or other entities may provide the webcam covers with their customized logos engraved on the obstructing member. This provides advertising to the user, as the user sees the webcam cover each time they use their electronic device. The logo may also show a sports team or other cause the user is interested in.

Accordingly, devices, systems and methods are provided which prevent light from reaching a light detecting portion of a camera. Such functionality prevents malicious users from surreptitiously turning on a user's camera without their knowledge and recording events that the user does not wish to have recorded. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A camera obstructing device comprising:
a structural housing configured to provide support for an obstructing member, the structural housing comprising a top channel and a bottom channel through which the obstructing member is configured to slide from an open position to a closed position; and
the obstructing member, comprising:
a first raised edge configured to contact a first outside edge of the structural housing when in the open position;
a second raised edge configured to contact a second opposite edge of the structural housing when in the closed position;
a first section having an aperture that allows light to reach a light sensor of a camera when placed in the open position;
a second section having blocking material configured to substantially prevent light from reaching the light sensor of the camera when placed in the closed position; and
at least one notch on a surface of the top channel or the bottom channel, the notch being configured to hold the obstructing member in place in either the open position or in the closed position.

2. The camera obstructing device of claim 1, wherein the notch on the surface of the top channel comprises a first notch, the camera obstructing device further comprising a second notch on a surface of the bottom channel, the first notch being configured to hold the obstructing member in place in the open position, and the second notch being configured to hold the obstructing member in the closed position.

3. The camera obstructing device of claim 1, wherein the obstructing member is coated with a printable material.

4. The camera obstructing device of claim 1, wherein the structural housing is fastened over a lens of the camera using an adhesive optimized for adherence to electronic devices.

5. The camera obstructing device of claim 1, wherein the obstructing member is interchangeable with a second, different obstructing member.

6. The camera obstructing device of claim 1, wherein the structural housing is designed to provide a specified gap between the obstructing member and the camera.

7. The camera obstructing device of claim 1, wherein the structural housing is made of at least one of the following: silicone, rubber, foam, or plastic.

8. A camera obstructing device comprising:
a structural housing configured to provide support for an obstructing member, the structural housing comprising a frame and an aperture, the frame providing a channel through which the obstructing member is configured to slide from an open position to a closed position; and
the obstructing member, comprising:
a raised edge configured to contact a first interior edge of the structural housing frame when in the open position, and being further configured to contact a second interior edge of the structural housing frame when in the closed position; and
at least a portion of blocking material configured to substantially prevent light from reaching the light sensor of the camera when placed in the closed position;
wherein:
the grip portion of the obstructing member includes at least one edge that is configured to come into contact with an outer edge of the frame;
the obstructing member is formed using printable material comprising acrylonitrile, butadiene styrene, or printable metal; and
the structural housing is fastened over a lens of the camera using an adhesive optimized for adherence to electronic devices.

9. The camera obstructing device of claim 8, wherein the obstructing member further includes a grip portion.

10. The camera obstructing device of claim 8, wherein the grip portion of the obstructing member includes a raised edge that substantially surrounds the grip portion.

11. The camera obstructing device of claim 8, wherein the obstructing member locks into place when slid into the closed position.

12. The camera obstructing device of claim 8, wherein the structural housing is made of at least one of the following: silicone, rubber, foam, or plastic.

13. A camera obstructing device comprising:
a structural housing configured to provide support for an obstructing member, the structural housing having at least one rotatable fastener which fastens the obstructing member to the structural housing, and on which the obstructing member pivots from an open position to a closed position, the structural housing including at least one raised exterior edge configured to support the obstructing member in the closed position; and
the obstructing member configured to prevent light from reaching a light sensor of a camera when in the closed position.

14. The camera obstructing device of claim 13, wherein the structural housing further comprises at least one notch configured to hold the obstructing member in place in the open position.

15. The camera obstructing device of claim 13, wherein the rotatable fastener provides sufficient rotational resistance to hold the obstructing member in the open position.

16. The camera obstructing device of claim 13, wherein the structural housing is made of at least one of the following: silicone, rubber, foam, or plastic.

17. A camera obstructing device comprising:
a substructure configured for mounting on an electronic device, the substructure including a plurality of rails positioned substantially parallel relative to each other, wherein the rails are connected via a connecting member;
an obstructing member configured to slide on the rails from an open position to a closed position, the obstructing member including:
an interior extruding portion that is designed to contact the connecting member to prevent movement past the closed position; and
at least a portion of blocking material configured to substantially prevent light from reaching a light sensor of a camera when placed in the closed position.

18. The camera obstructing device of claim 17, wherein the obstructing member has channels that attach the obstructing member to the plurality of rails.

19. The camera obstructing device of claim 17, wherein the obstructing member is laser etched according to a specified design.

20. The camera obstructing device of claim 17, wherein the obstructing member is formed using printable plastic.

21. A camera obstructing device comprising:
a structural housing configured to provide support for an obstructing member, the structural housing comprising:
a top channel and a bottom channel through which the obstructing member is configured to slide from an open position to a closed position;
a first side edge connected to the top and bottom channels at a first end, the first side edge being configured to retain an obstructing member when in the closed position; and
a second side edge connected to the top and bottom channels at a second end, the second side edge being configured to retain the obstructing member when in the open position; and
the obstructing member, comprising:
a portion of blocking material configured to substantially prevent light from reaching a light sensor of a camera when placed in the closed position,
wherein the obstructing member is configured to slide on the first and second channels between the open position and the closed position.

22. The camera obstructing device of claim 21, wherein the obstructing member is configured to snap into place between the top channel and the bottom channel.

23. The camera obstructing device of claim 22, wherein the obstructing member is reversible, such that the obstructing member can be unsnapped, flipped and re-snapped into place between the top and bottom channels.

24. The camera obstructing device of claim 21, wherein the top and bottom channels include a lip that holds the obstructing member in place within the structural housing.

25. The camera obstructing device of claim 21, wherein the structural housing is made of at least one of the following: silicone, rubber, foam, or plastic.

* * * * *